United States Patent [19]

Chouraki et al.

[11] Patent Number: 5,594,792
[45] Date of Patent: Jan. 14, 1997

[54] METHODS AND APPARATUS FOR MODELING AND EMULATING DEVICES IN A NETWORK OF TELECOMMUNICATION SYSTEMS

[75] Inventors: Philippe J. Chouraki, San Francisco; Simon F. Moloney, Redwood City; Mark A. Russell, San Francisco; David R. Preston, Los Gatos, all of Calif.

[73] Assignee: American Telecorp, Redwood Shores, Calif.

[21] Appl. No.: 188,473

[22] Filed: Jan. 28, 1994

[51] Int. Cl.⁶ .............................. H04M 1/57; H04M 1/64
[52] U.S. Cl. ............................. 379/269; 379/67; 379/92
[58] Field of Search .................................. 379/201, 269, 379/207, 10, 11

[56] References Cited

U.S. PATENT DOCUMENTS

| | | | |
|---|---|---|---|
| 4,191,860 | 3/1980 | Weber . | |
| 4,611,094 | 3/1986 | Asmuth . | |
| 4,611,096 | 9/1986 | Asmuth . | |
| 4,827,500 | 5/1989 | Binkerd et al. | 379/88 |
| 4,878,240 | 10/1989 | Lin | 379/67 |
| 4,924,510 | 5/1990 | Le | 379/221 |
| 4,987,587 | 1/1991 | Jolissaint | 379/94 |
| 5,097,528 | 3/1992 | Gursahaney | 379/67 |
| 5,136,636 | 8/1992 | Wegrzynowicz | 379/207 |
| 5,239,577 | 8/1993 | Bates | 379/201 |
| 5,247,571 | 9/1993 | Kay et al. | 379/207 |
| 5,311,572 | 5/1994 | Friedes et al. | 379/67 |
| 5,329,582 | 7/1994 | Bogart | 379/201 |
| 5,333,188 | 7/1994 | Bogart | 379/220 |
| 5,343,517 | 8/1994 | Bogart | 379/219 |
| 5,353,331 | 10/1994 | Emery et al. | 379/58 |
| 5,386,459 | 1/1995 | Veeneman | 379/96 |
| 5,386,467 | 1/1995 | Ahmad | 379/220 |
| 5,448,632 | 9/1995 | Iyob et al. | 379/201 |

FOREIGN PATENT DOCUMENTS

| | | |
|---|---|---|
| 928502764 | 11/1992 | European Pat. Off. . |
| 91035394 | 2/1991 | United Kingdom . |

OTHER PUBLICATIONS

Pais, A. F., Software Tools to Support A Performance Modeling Environment, Teletraffic Science For New Cost–Effective Systems, Networks & Services, ITC–2. Proceedings of the 12th International Teletraffic Congress, pp. 1222–1228 vol. 2, 1989, Abstract, INSPEC Abstract No.: C90002692.

*Primary Examiner*—Jeffery Hofsass
*Assistant Examiner*—Thomas F. Presson
*Attorney, Agent, or Firm*—Blakely, Sokoloff, Taylor & Zafman

[57] ABSTRACT

A compiler is provided to a network element management subsystem for compiling rules and behaviors of device types into nested meta data structures of model databases. The rules and behaviors of the device types are specified via definitions describing controls of the device types, and features assignable to the device types. In one embodiment, the compiler is a two phase compiler comprising a parsing and list building phase and a database building phase. The device type model databases are loaded into memory to allow fast access and traversal. Each of the model databases comprises a plurality of nested meta data structures. Data are conditionally retrieved by selectively traversing the model databases using navigation sequences. An array of evaluation functions is further provided to evaluate predicates embedded in the nested meta data structures in view of operational data. During operation, user and system actions are interpreted through device emulation accessing the appropriate model databases.

22 Claims, 25 Drawing Sheets

```
DefSet BTS:1
  Limit:20;
  Button(1): Code;
  end;
```
104

```
DefSet M5209:4
  Limit: 64;
  Button(1): Code;
  Button(2): Lamp;
  Button(3): NoLamp;
  end;
```
106

Figure 9a

```
DefButton Code:1
end;
```

```
DefButton Lamp:2
end;
```
108

```
DefButton NoLamp:3
end;
```

Figure 9b

116 {
    DefFeature CXR:26
    Short: 'CXR';
    Long: 'Call Transfer';
    Status: Supported;

122 {
    Assignment(Set=BTS): Feature(TN);
    Assignment(Set=M5209): Button(Lamp);

128 {
    Access(Set=BTS): Code;
    Access(Set=M5209): Button;

110

Help: 223;
    Limit: 1;
134 → IncFeature(Set=M5209): 3WC;

140a {
    DefParam CXRTYPE:1
    Prompt: 'Transfer Type';
    Type: EnumType('%Outgoing%Incoming%Intragroup%All%Attendant
        %Intergroup%Other%');
    Default: 'All';
    Pattern: '[CTOUTICTINCICTINTRAICTALLIATTRCLFINCTICUSTOM]';
    Next(Generic<26)[INTERNAL]: ORGINTER(='Other');
    Next(Generic<26)[EXTERNAL]: ORGINTER(='CUSTOM');
    Next(Generic>=26)[INTERNAL]: ORGINTER(='Other'), CXRRCL(<>'Other');
    Next(Generic>=26)[EXTERNAL]: ORGINTER(='CUSTOM'), CXRRCL(<>'CUSTOM');
    end;

140b {
    DefParam ORGINTER:2
    Prompt: '2nd Leg of Orig. Controlled Intergroup Call';
    Type: EnumType('%Attendant%Intergroup%Intragroup%Inter/Intragroup
        %No Transfer%');
    Default: 'Attendant';
    Pattern: '[ACIINTERIINTRAITRATERINOCXFER]';
    end;

140c {
    DefParam ORGINTRA:3
    Prompt: '2nd Leg of Orig. Controlled Intragroup Call';
    Type: EnumType('%Attendant%Intergroup%Intragroup%Inter/Intragroup
        %No Transfer%');
    Default: 'Attendant';
    Pattern: '[ACIINTERIINTRAITRATERINOCXFER]';
    end;

140d {
    DefParam TRMINTER:4
    Prompt: '2nd Leg of Term. Controlled Intergroup Call';
    Type: EnumType('%Attendant%Intergroup%Intragroup%Inter/Intragroup
        %No Transfer%');
    Default: 'Attendant';
    Pattern: '[ACIINTERIINTRAITRATERINOCXFER]';
    end;

Figure 9c-1

```
        ┌ DefParam TRMINTRA:5
        │   Prompt: '2nd Leg of Term. Controlled Intragroup Call';
        │   Type: EnumType('%Attendant%Intergroup%Intragroup%Inter/Intragroup
140e ┤            %No Transfer%');
        │   Default: 'Attendant';
        │   Pattern: '[AC|INTER|INTRA|TRATER|NOCXFER]';
        └ end;
        ┌ DefParam  CXRRCL(Generic>=26):6
        │   Prompt: 'Transfer Recall';
        │   Type: YNType;
        │   Default: 'No';
140f ┤  Pattern: '[N|Y]';
        │   Next(Generic<32): RCLTIME(='Y');
        │   Next(Set=BTS,Generic>=32): METHODBTS(='N'), RCLTIME(='Y');
        │   Next(Set=M5209,Generic>=32): METHODEBS(='N'), RCLTIME(='Y');
        └ end;
        ┌ DefParam RCLTIME(Generic>=26):7
        │   Prompt: 'Recall Time';                                      110
        │   Type: WrdType(12-120);
140g ┤  Default: '12';
        │   Pattern: '#+3<12-120>';
        └ end;
        ┌ DefParam METHODBTS(Set=BTS,Generic>=32):8
        │   Prompt: 'Call Transfer Method';
        │   Type: EnumType('%Standard%Dial%');
140h ┤  Default: 'Standard';
        │   Pattern: '[STD|DIAL]';
        └ end;
        ┌ DefParam METHODEBS(Set=M5209,Generic>=32):9
        │   Prompt: 'Call Transfer Method';
        │    Type: EnumType('%Standard%Release%Dial%');
140i ┤  Default: 'Standard';
        │   Pattern: '[STD|RLS|DIAL]';
        │   end;
        └ end;
```

Figure 9c-2

117 { DefFeatureTN:1
    Assignment: Button(Lamp);
    end;

111

118 { DefFeature 3WC(Set=M5209):3
    end;

Figure 9d

|  | 0 1 | 2 3 | 4 5 | 6 7 | 8 9 | A B | C D | E F |
|---|---|---|---|---|---|---|---|---|
| 0: | 8C 06 | | | | | | | |
| 10: | | | | | | 28 00 | C0 01 | 24 03 |
| 20: | 5C 03 | AE 03 | | | 98 01 | 36 00 | FC 01 | 01 00 |
| 30: | 50 00 | 6A 00 | | 06 00 | D6 03 | | 54 4E | |
| 40: | | | | | | | | |
| 50: | 06 00 | 00 00 | | 33 57 | 43 | | | |
| 60: | | | | | | | 06 00 | E8 03 |
| 70: | 43 58 | 52 | | | | | | 84 00 |
| 80: | | | 3C 01 | 42 01 | 14 02 | 06 00 | 20 02 | 04 00 |
| 90: | 2E 02 | 02 00 | 3C 02 | 21 00 | 14 02 | 06 00 | 48 02 | 04 00 |
| A0: | 52 02 | 02 00 | 60 02 | 19 00 | | | | |
| ... | | | | | | | | |
| D0: | | | | | | 50 01 | 5E 01 | 6C 01 |
| E0: | 7A 01 | | | 88 01 | | | | |
| 120: | | | | | | 96 01 | | |
| 130: | | | A4 01 | | | | | B2 01 |
| 140: | | 04 01 | | | | | | |
| 150: | 04 02 | | | | | | | 04 03 |
| 160: | | | | | | | 04 04 | |
| 170: | | | | | 04 05 | | | |
| 180: | | | | 04 06 | | | | |
| 190: | | | | 04 07 | | | | |
| 1A0: | | | 04 08 | | | | | |
| 1B0: | | 04 09 | | | | | | |
| 1C0: | 64 01 | | | | | | | |
| 1D0: | | | | | | | | |
| 1F0: | | | | | | | | |
| 200: | | | | | | | | |
| 210: | | | | | | | | |
| ... | | | | | | | | |
| 310: | | | | | | | | |
| 320: | | | 38 00 | 2C 03 | 44 03 | | 05 00 | |
| 330: | | 42 54 | 53 | | | | | |
| 340: | | | 05 00 | | | 4D 35 | 32 30 | 39 00 |
| 350: | | | | | | | 52 00 | 66 03 |
| 360: | 7E 03 | 96 03 | | 09 00 | | | 43 6F | 64 65 |
| 370: | | | | | | | | 09 00 |
| 380: | | | 4C 61 | 6D 70 | | | | |
| 390: | | | | 09 00 | | | 4E 6F | 4C 61 |
| 3A0: | 6D 70 | | | | | | | 9A 00 |
| 3B0: | | | CA 03 | D0 03 | D6 03 | | | |
| 3C0: | | | | | | | 06 00 | 6A 00 |
| 3D0: | 06 00 | 50 00 | | 12 00 | | | | |
| 3E0: | | | | | 12 00 | FC 01 | 01 00 | F2 03 |
| 3F0: | | 0B 01 | 14 00 | D0 03 | | 06 00 | 36 00 | |
| 400: | | | | | | | | |
| 410: | | | | | | | | |
| 420: | | | | | | | | |
| 430: | | | | | | | | |
| 440: | | | | | | | | |
| ... | | | | | | | | |
| 680: | | | | | | | | |

Figure 9i

|     | 0 1 | 2 3 | 4 5 | 6 7 | 8 9 | A B | C D | E F | |
|-----|-----|-----|-----|-----|-----|-----|-----|-----|---|
| 60: |     |     |     |     | --  | 06 00 | E8 03 | 1A 00 | CXR Header |
| 70: | 43 58 | 52 00 |   |   | 01 00 | DF 00 |   | 84 00 | |
| 80: |     | 7C 06 |   |   |     |     |     |     | |

|      | 0 1 | 2 3 | 4 5 | 6 7 | 8 9 | A B | C D | E F | |
|------|-----|-----|-----|-----|-----|-----|-----|-----|---|
| 80:  |     |     | 3C 01 | 42 01 | 14 02 | 06 00 | 20 02 | 04 00 | Feature CXR |
| 90:  | 2E 02 | 02 00 | 3C 02 | 21 00 | 14 02 | 06 00 | 48 02 | 04 00 | |
| A0:  | 52 02 | 02 00 | 60 02 | 19 00 | 6C 02 | 0A 00 | 20 02 | 08 00 | |
| B0:  | 2E 02 | 02 00 | 2A 02 | 11 00 | 7C 02 | 02 00 | 8A 02 | 13 00 | |
| C0:  | 6C 02 | 0B 00 | 48 02 | 09 00 | 52 02 | 02 00 | 2A 02 | 05 00 | |
| D0:  | 96 02 | 02 00 | B0 02 | 07 00 |     | 50 01 | 5E 01 | 6C 01 | |
| E0:  | 7A 01 | 6C 02 | 20 00 | 88 01 | BC 02 | 04 00 | CC 02 | 02 00 | CXR Param Sequence |
| F0:  | D6 02 | 1B 00 | E2 02 | 0A 00 | 08 02 | 08 00 | F2 02 | 02 00 | |
| 100: | EE 02 | 18 00 | CC 02 | 02 00 | FC 02 | 0F 00 | E2 02 | 0B 00 | |
| 110: | FC 01 | 09 00 | F2 02 | 02 00 | 08 03 | 11 00 | CC 02 | 02 00 | |
| 120: | 18 03 | 03 00 |     | 6C 02 | 01 00 | 96 01 | 08 02 | 03 00 | |
| 130: | E2 02 | 01 00 | A4 01 | FC 01 | 03 00 | E2 02 | 01 00 | B2 01 | |
| 140: |     |     |     |     |     |     |     |     | |

|      | 0 1 | 2 3 | 4 5 | 6 7 | 8 9 | A B | C D | E F | |
|------|-----|-----|-----|-----|-----|-----|-----|-----|---|
| 140: |     | 04 01 |   |   |     |     |     |     | |
| 150: | 04 02 |   |   |   |     |     |     | 04 03 | |
| 160: |     |   |   |   |     |     | 04 04 |     | |
| 170: |     |   |   |   |     | 04 05 |     |     | |
| 180: |     |   |   |   | 04 06 |     |     |     | CXR Parameters |
| 190: |     |   |   | 04 07 |     |     |     |     | |
| 1A0: |     |   | 04 08 |   |     |     |     |     | |
| 1B0: |     | 04 09 |   |   |     |     |     |     | |

Figure 9k

|      | 0 1  | 2 3  | 4 5  | 6 7  | 8 9  | A B | C D  | E F  |
|------|------|------|------|------|------|-----|------|------|
| 1C0: |      |      |      |      |      |     |      |      |
| 1D0: |      |      |      |      |      |     |      |      |
| 1E0: |      |      |      |      |      |     |      |      |
| 1F0: |      |      |      |      |      |     | 01 01 |      |
| 200: |      |      |      |      | 01 01 |     |      |      |
| 210: |      |      | 01 03 |      |      |     |      |      |
| 220: | 01 00 |      |      |      | 01 04 |     |      | 01 02 |
| 230: |      |      |      |      |      |     | 01 04 |      |
| 240: |      |      |      |      | 01 00 |     |      |      |
| 250: |      | 01 02 |      |      |      |     |      |      |
| 260: | 01 04 |      |      |      |      |     | 01 03 |      |
| 270: |      |      |      |      | 01 04 |     | 01 02 |      |
| 280: |      |      |      |      | 01 04 |     |      |      |
| 290: |      |      |      | 01 02 |      |     |      |      |
| 2A0: |      |      | 01 04 |      |      |     |      |      |
| 2B0: | 01 04 |      |      |      |      |     | 01 03 |      |
| 2C0: |      |      |      |      | 01 04 |     | 01 02 |      |
| 2D0: |      |      |      | 01 04 |      |     |      |      |
| 2E0: |      | 01 03 |      |      |      |     |      | 01 04 |
| 2F0: |      | 01 02 |      |      |      |     | 01 04 |      |
| 300: |      |      |      |      | 01 04 |     | 01 04 |      |
| 310: |      |      |      |      | 01 04 |     |      |      |
| 320: |      |      | --   |      |      |     |      |      |

Predicates

Figure 9I

METHODS AND APPARATUS FOR MODELING AND EMULATING DEVICES IN A NETWORK OF TELECOMMUNICATION SYSTEMS

BACKGROUND OF THE INVENTION

1. Field of the Invention

The present invention relates to the field of telecommunications network management systems. More specifically, the present invention relates to modeling and emulating devices in telecommunications networks for software systems.

2. Background

In the telecom industry, complex and specialized software and hardware systems are a given. Because each system is specialized, information used by one system is not easily manipulated for use in another. As a result, software designers are constantly asked to provide solutions, via software, that can integrate different systems in a consistent and easy-to-use manner.

Designing and building software that is consistently easy to use and can integrate and manipulate information from other systems is often extremely difficult. Device modeling gives to the software systems designer a method for representing behaviors of very complex devices in a model that is simple to use and understand. The model will remain the same even if the device changes; thus, the software designer is free to concentrate on the functional capability of a device.

Where a model is a simplified description of a system, a device model describes a particular element of the system. In a complex telecommunications network management system, devices might be central offices switches, PBXs, telephones, or the interfaces to applications such as work order systems, inventory systems, billings systems and so on. To build a device model, the device must first be identified: the scope of its function—"what it does", and the constraints under which it operates—"how it does". For example, to build a simplified device model of a telephone, the telephone's functions will first be identified, i.e.

1) A telephone transmits electronically encoded sounds between two locations.
2) A telephone allows a user to turn on or off pre-programmed functions (features). Then, the telephone's constraints are identified, i.e.
1) Activating the telephone handset sends a signal that conversation may begin.
2) Dialing numbers on the keypad identifies the other person in the conversation.
3) The handset at the dialed end alerts the person there that someone wishes to talk.
4) When the dialed handset is activated conversation between parties can take place.
5) Conversation is ended when either party deactivates his or her handset.
6) To manage pre-programmed functions, the user activates the handset and presses a specific button or dials specific numbers to turn those functions on or off; then the user deactivates the handset.

The model is then constructed from the functions and the constraints, i.e.

People talk to each other on the telephone through handsets. One person has to call the other person. The called handset must be used to answer the call. The caller must know the dialing number of the person being called. Conversation can only take place if both people use their respective handsets during the call. Either party can end the call. Telephone pre-programmed functions are controlled with buttons or special numbers.

In other words, the device model defines in basic terms what a device is for, how to use it, and how it works. A crucial point about device modeling is that the model can ignore many aspects of a device and still be highly valuable. In the telephone example, the concentration was on the functional aspects, and the physical descriptions such as type and color are omitted. With device modeling, the designer concentrates on what each device does, creating a functional software core that is generic and highly adaptable in integrating with other devices or components of the system. In short, device modeling separates the things that change from the things that are universal.

Device emulation is used to mimic the behavior of a modeled device and its features. Where the device model is used in the context of device emulation, the device model is invoked as part of the application. Therefore, the capability of an application can be expanded by simply providing a new device model for any given device type. Of course, different applications are free to use the emulation of a device type for different purposes. Essentially, device emulation provides the "how" to device modeling's "what". Device emulation allows new features to be introduced in the system in a standard way, thus avoiding code changes, which in turn leads a more reliable product, and shorter development cycle.

Device emulation enables system developers to focus more on the system's functional objectives than on the peculiarities of the device or network elements being managed. All information exchanges between the network management software and the network elements take the form: 1) what needs to be done—the action, and, 2) what to do it with—the data. As an intermediary between components, the device emulation adds interpretation or knowledge (the how) to the action-plus-data (the what). When a user makes a change to a device, the network management software interprets what that change means using device emulation and then makes that change directly on the device. The device's response is in turn interpreted so the management software can understand it.

Device modeling and emulation have been used in prior art products, such as the CENPAC network management software, Version 4.0, produced by American Telecorp of Redwood Shores, Calif., the assignee of the present invention. Under CENPAC, the device models are stored in a database using mass storage. As the number and varieties of devices, and complexity of telecom systems continue to increase, the traditional approach of storing and accessing device models in databases on mass storage is found to be increasingly limiting in performance as well as flexibility of the systems. Furthermore, as the device model becomes more complex, the characteristics/behaviors of a device that is modeled become highly interdependent with a large variability as to how the device model might be accessed so as to cause a particular device's characteristic to manifest itself. Typically, a manifestation of a characteristic is arrived at via a series of evaluations within the device model which may cause the access path in the device model to branch in a non-obvious manner. Thus, it becomes impractical to implement access and storage methods using the normal input/output (I/O) bound database and mass storage oriented technologies. Also the characteristics of a device can vary so greatly that it becomes impossible to predetermine the optimal database/storage schema ahead of time.

Therefore, it is desirable to bring forward a technology that is optimal for dealing with the needed flexibility when storing data and the needed access performance. The objects of the invention are to create a device model which was small enough so that it could be easily loaded as part of the execution environment of a program, and the model would allow very fast access capability and a great degree of flexibility as to how the behavior of the device might be defined. As will be disclosed, the present invention provides a method and apparatus for modeling and emulating devices in a manner that advantageously achieves the above described desirable results.

SUMMARY OF THE INVENTION

Under the present invention, the desirable results are advantageously achieved by providing a compiler to a network element management system for compiling rules and behaviors of device types into nested meta data structures of model databases. The model database is a nested, recursively accessed meta-structure that can be thought of as a compiled database combining data objects with predicates that govern access to the objects and slots that represent relationships between objects. For ease of discussion, we refer to an instance of the structure as a buffer. A model database buffer may contain its type, its size, a sequence of offsets to other locations within the encompassing buffer, and its object data. A sequence may combine both offsets to predicates and offsets to data objects. The object data may contain offsets to other buffers or sequences. The device type model databases are loaded into memory to allow fast access and traversal. During operation, user and system actions are interpreted through device emulation accessing the appropriate model databases.

The rules and behaviors of the device types are specified via definitions describing controls of the device types, and features assignable to the device types including their assignability, accessibility, dependencies, incompatibility, and parameters. In one embodiment, the compiler is a two phase compiler comprising a parsing and list building phase and a database building phase. Each of the model databases comprises a plurality of nested meta data structures. Each of the nested meta data structures comprises certain data about the device types, predicates, and navigation sequences governing the conditional retrieval of the data, organized in one or more nesting levels. Each navigation sequence is an ordered combination of predicate pointers, jump pointers, and data pointers, having certain predetermined structural relationships. The predicate pointers point to predicates, whereas the data pointers point to data or other navigation sequences. The jump pointers point to other predicate and data pointers within the navigation sequence.

During operation, data are conditionally retrieved by selectively traversing the navigation sequences based on the predetermined structural relationship, the evaluation results of the predicates pointed to by the predicate pointers, and the jump pointers. An array of evaluation functions is further provided to evaluate the predicates in view of operational data.

Figure 2:
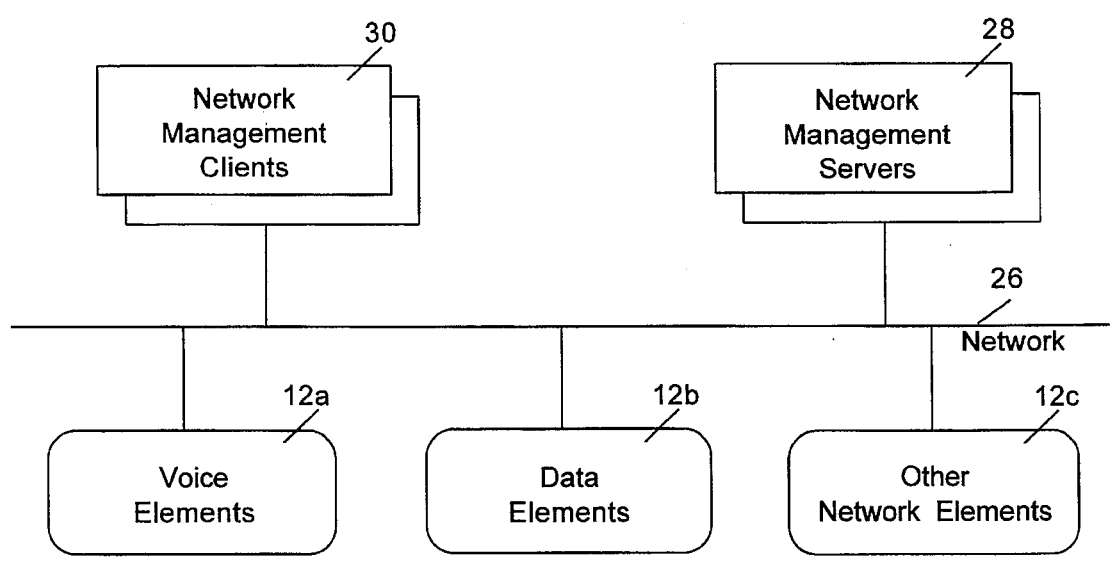
FIG. 2 is a system view of an exemplary network of telecommunication systems incorporating the integrated telecommunication network management system of FIG. 1.

Note FIG. 9c includes 9c–1 and its extension FIG. 9c–2. All references to this Figure in the specification refer to the figure proper and its extension.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
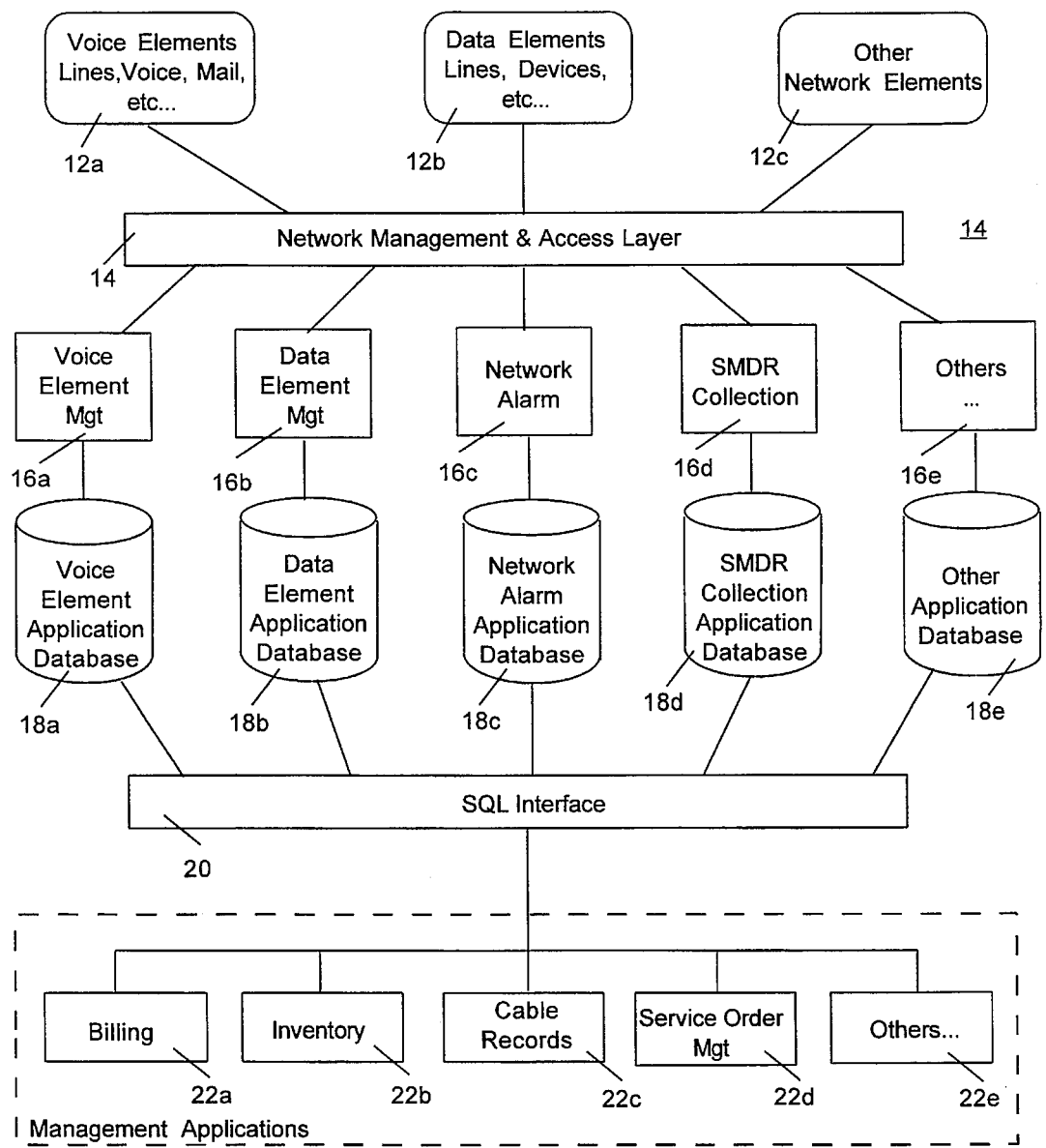
FIG. 1 an architectural view of an integrated telecommunication network management system applying the teachings of the present invention.

Referring now to FIG. 1, a block diagram illustrating the architecture of an exemplary integrated telecommunication network management system applying the teachings of the present invention is shown. The network elements, such as voice elements 12a, data elements 12b, and other elements 12c, are accessed through a network management and access layer 14. Particular examples of voice, data, and other elements 12a–12c include telephone services, provisioning, adding or deleting telephone options, trunk lines, provisions of bandwidth for Wide Area Network applications, and service control points. The network management and access layer 14 implements the specific device protocols, thereby freeing the core of the management software from such device details. The software core is typically organized into a number of subsystems 16a–16e, with each subsystem dedicated to managing a "family" of network elements, such as voice elements, data elements, network alarms, and Station Message Detail Recording (SMDR) collections. Typically, each subsystem also has its own databases 18a–18e for storing various profile, operational, and management data. In particular, these data include device type models where the various network devices being managed are modeled. The various management subsystems 16a–16e use the model data to emulate network devices when interpreting user or system actions. Additionally, the data are accessed by various management applications 22a–22e, such as billing, inventory, cable records, and service orders, through a database interface such as a Structured Query Language (SQL)interface.

There are many variations on how these elements 12a–12c, 14, 16a–16e, 18a–18e, 20, and 22a–22e are architecturally arranged. In some variations, the functions provided by some of these elements are combined, while in other variations, the functions provided by these elements may be further subdivided. The architecture illustrated is intended to be representative of a broad category of integrated telecommunication network management systems where device modeling and emulation is employed for performance and extendibility.

FIG. 2, a block diagram, illustrates an exemplary telecommunications network system incorporating the integrated network management system of FIG. 1. The exemplary telecommunications network system 24 is comprised of a number of voice elements 12a, a number of data elements 12b, and a number of other elements 12c, connected to each other through a network 26. Particular examples of suitable networks include telephone company deployed voice and data service networks for business customers or hybrid networks that are built by large end-users of telecommunication services. Additionally, the exemplary network 24 further comprises a number of servers 28 executing the network management and access layer and the back end portions of the management subsystems and applications, and storing some portions of the system databases described earlier. Particular examples of suitable servers include workstations with non-proprietary operating systems like UNIX or proprietary network operating systems, that execute file retrieval and database record retrieval processes. Furthermore, the exemplary network 24 comprises a number of clients 28 executing the front end portions of the subsystem and applications, and storing the remaining portions of the system databases described earlier. Particular examples of suitable clients include DOS and Windows client applications or any program executing on a workstation accessing or storing information on the servers. Network management users manage the network through the clients 30, which accomplish the management functions in cooperation with the servers 28.

While the present invention is being described with an exemplary telecommunications network system implementing the integrated network management system in a distributed manner, it will be appreciated that the present invention may be practiced with a centralized as well as a distributed telecommunications network system.

Figure 3:
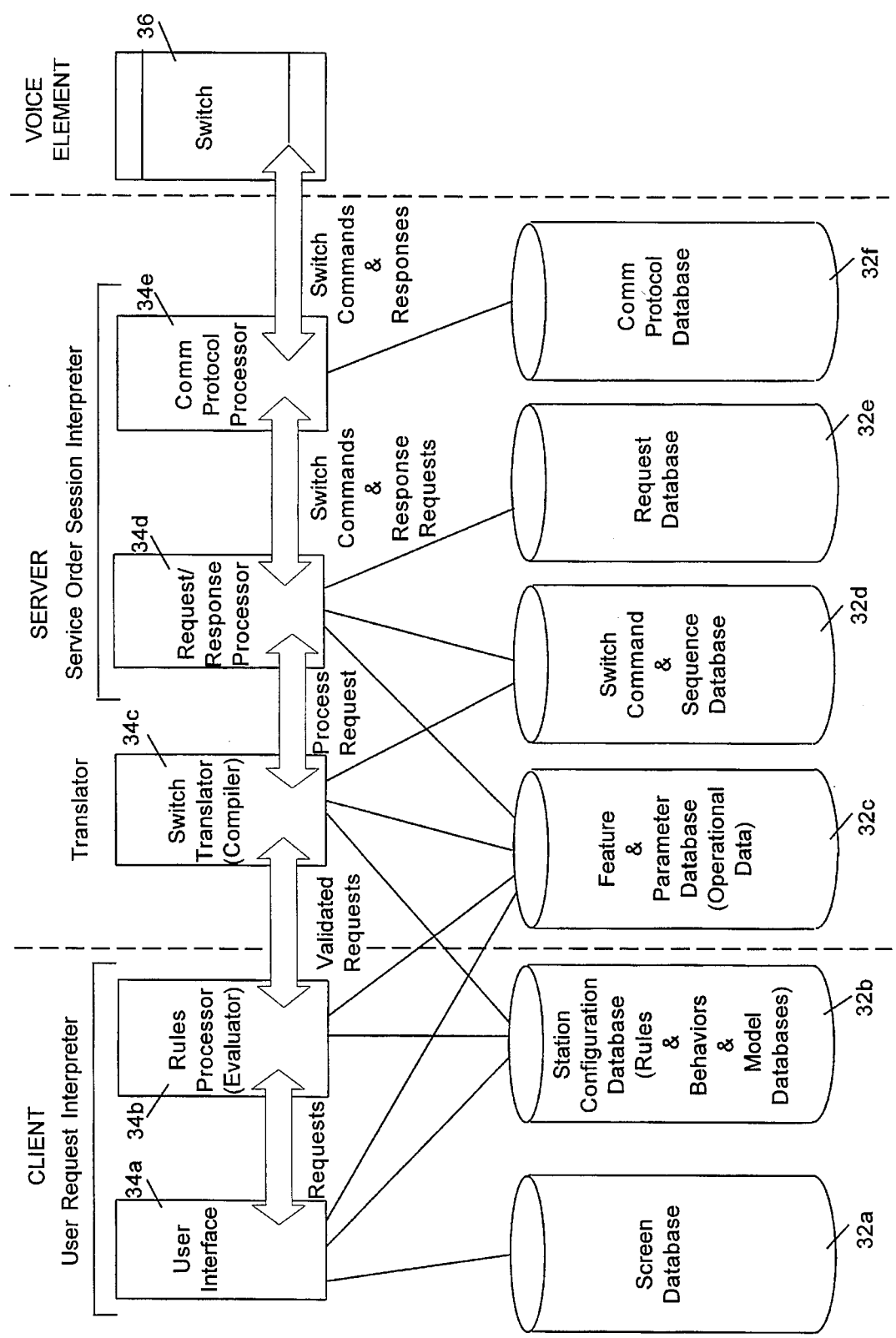
FIG. 3 illustrates the relevant portions of one embodiment of the network management and access layer, the voice element management subsystem, and the voice element management databases of FIG. 1 in further detail.

FIG. 3, a block diagram, illustrates the relevant portions of one embodiment of the network management and access layer, the voice element management subsystem, and the voice element management databases of FIG. 1. Under this embodiment, the voice element management databases comprise a screen database 32a, a station configuration database 32b, a feature and parameter database 32c, a switch command and sequence database 32d, a request database 32e, and a communication protocol database 32f, located on the client and server as shown. The screen database stores user interface screens. The station configuration database 32b further stores rules and behaviors of device types—the device models—whereas the feature and parameter database 32c further stores the operational data of the devices. In the presently preferred embodiment, the device type models are copied into memory during operation to allow faster access and traversal. Rules and behaviors of device types, device type models, operational data of devices, and their usages will be described in further detail below.

The voice element subsystem comprises a user interface 34a, a rules processor 34b, a switch translator 34c, and a request/response processor 34d executed on the client and server as illustrated. These elements 34a–34d access the various databases 32a–32e as shown. To request a switch to perform an operation, a user interacts with the user interface 34a to generate requests. The requests are validated by the rules processors 34b. The validated requests are in turn translated into process requests by the switch translator 34c. The process requests are then transformed into switch command requests by the request/response processor 34d. Response requests from the switch are transformed back to process requests by the request/response processor 34d. The process requests are in turn translated back to validated requests by the switch translator 34c. The validated requests are then forwarded from the rules processor 34b to the user through the user interface 34a.

Additionally, the switch translator 34c comprises a compiler for performing the above described compilations of the rules and behaviors of device types into device type models, whereas the rules processor 34b comprises an array of evaluation functions for performing the above described evaluations of the model predicates of the device type models against the operational data of the devices while traversing the device type models. The compiler and the evaluation functions will be described in further detail below.

Lastly, the network management and access layer comprises a communication protocol processor 34e executed on a server. The communication protocol processor 34e is used to transfer switch commands and responses to and from the switches 36.

While for ease of understanding, the present invention is being described with a particular embodiment of the voice element subsystem and its databases, based on the descriptions to follow, it will be appreciated that the present invention may be practiced without many of these details. Furthermore, the present invention may be practiced with other network element management subsystems.

Figure 4:
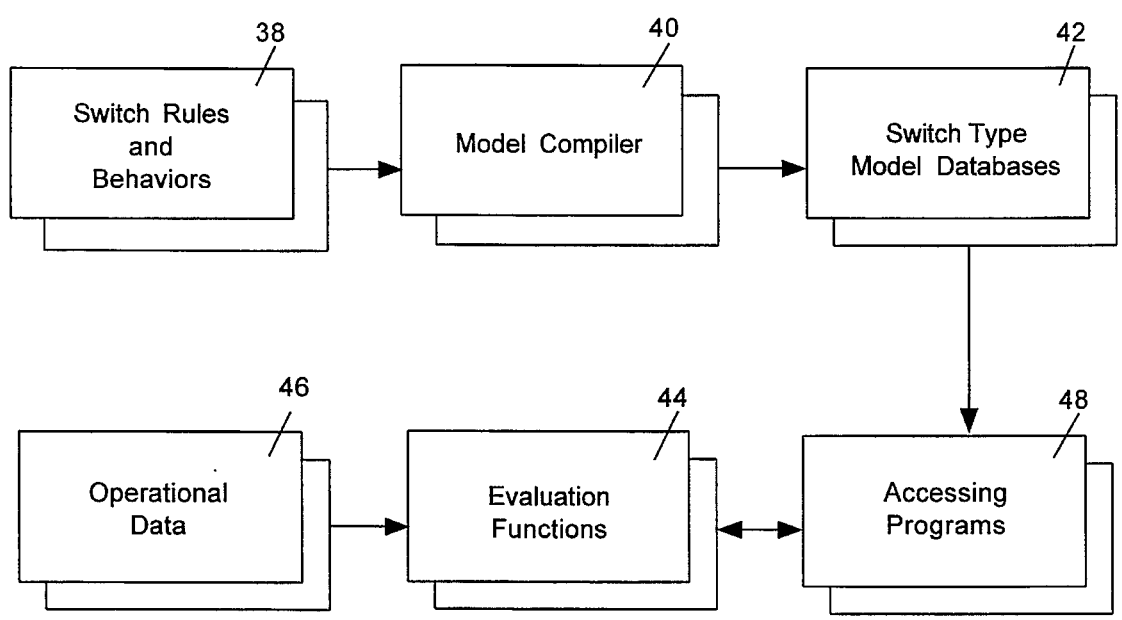
FIG. 4 illustrates the relationships between the device type rules and behaviors, the model compiler, the device type model databases, the accessing programs, the evaluation functions and the operational data of devices under the present invention.

Referring now to FIG. 4, a block diagram illustrating the relationships between the rules and behaviors specifications, the model compiler, the model databases, the accessing programs, the evaluation functions, and the operational data under the present invention is shown. As illustrated, the rules and behaviors specifications 38 are used to describe to the model compiler 40, control of device types, and features assignable for device types, including their assignability, accessibility, interdependencies, incompatibility, and parameters. For example, in a Centrex application, the rules and behaviors specifications 38 describe to the model compiler 40, the buttons of phone sets, the characteristics of the phone buttons, features such call forwarding and conference calls including whether they are assignable to certain phone sets, which buttons or codes can be used to access the features, whether call conferencing is dependent or incompatible with call forwarding, and parameters for call forwarding etc. etc. Exemplary rules and behaviors specifications are illustrated in FIGS. 9a–9d, which will be described in further detail below.

Figure 8:
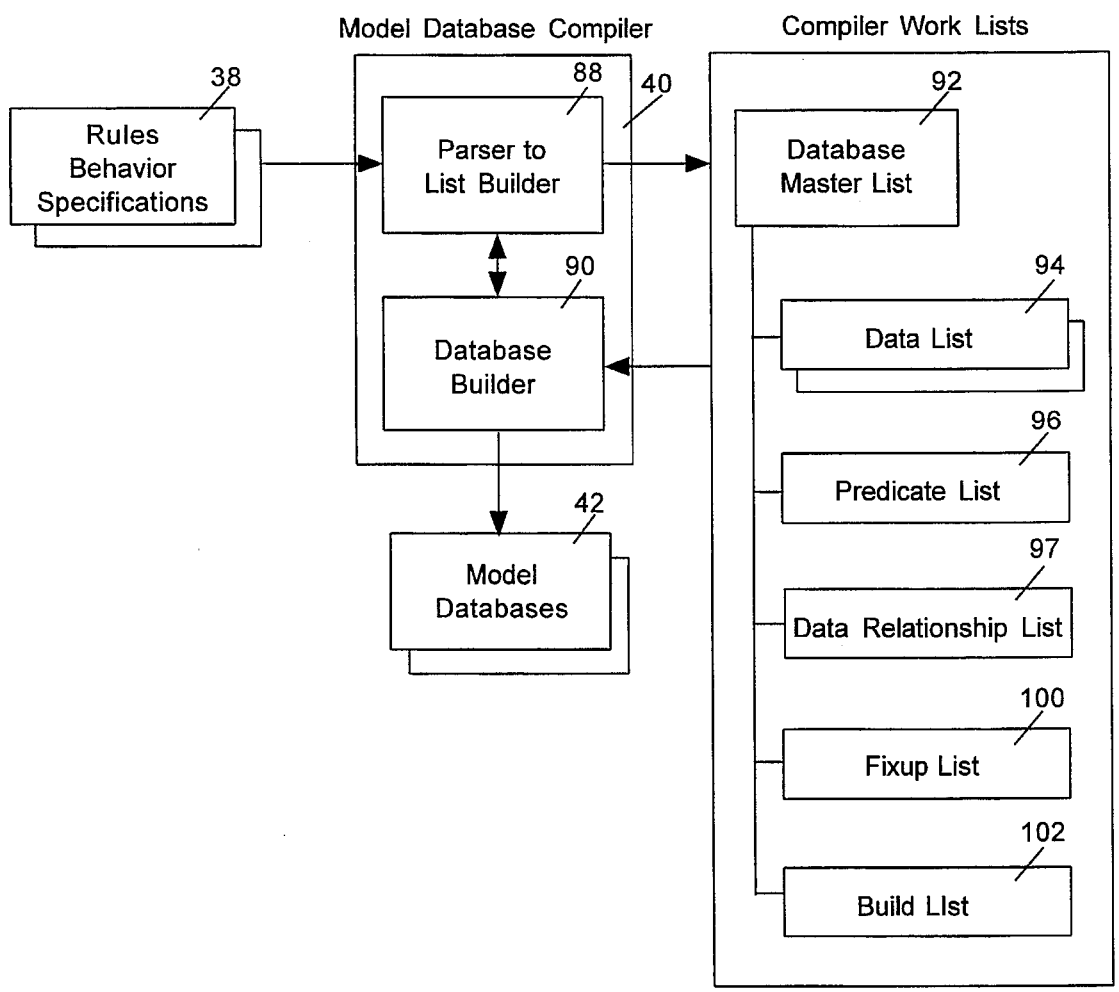
FIG. 8 illustrates one embodiment of the model compiler of the present invention and its working lists in further detail.

The model compiler 40 is used to generate the model databases 42 based on the rules and behavior specifications 38 provided. The model compiler 40 parses the formal specifications, analyzes the data and their relationships, determines the pre-conditions for the data, builds meta data structures, and then finally uses the meta data structures to build the model databases 42. One embodiment of the model compiler 40 is illustrated in FIG. 8, and an exemplary compilation is illustrated in FIGS. 9e–9h, which will be described in further detail below.

The model databases 42 store the compiled models of the device types. Each of the model databases 42 comprises a plurality of nested meta data structures modeling device types of a particular application. The nested meta data structures are traversed to retrieve the appropriate data about devices. As will be explained in further detail below, traversal of the nested meta data structures is governed by predicates of the nested meta data structures. The nested meta structures including the predicates and the traversal algorithm are illustrated in FIGS. 5–7, and an exemplary model database is illustrated in FIGS. 9i–9n, which will be described in further detail below.

During operation, the management software 48 accesses the appropriate model databases 42 to interpret user actions and device responses. Data about the devices are conditionally retrieved from the model databases 42 by the management software 48, traversing the meta data structures, and using the evaluation functions 44 to evaluate the predicates of the nested meta data structures in view of operational data 46. As will be obvious from the descriptions to follow, evaluation functions 44 and the operational data used 46 are application dependent. However, preferably, predicates are typed, and one evaluation function 44 is provided for each predicate type. For example, in a Centrex application, the predicates may be typed as types of telephone set predicates and feature predicates and parameter predicates, and separate evaluation functions 44 are provided to evaluate whether a particular telephone set of interest in a particular point in time is a telephone set of type A or type B, and what are the current settings for parameters "transfer recall" and "recall time" for a feature "call transfer." Exemplary accesses and evaluations of predicates are illustrated in FIG. 9o–9q, which will be described in further detail below.

Figure 5:
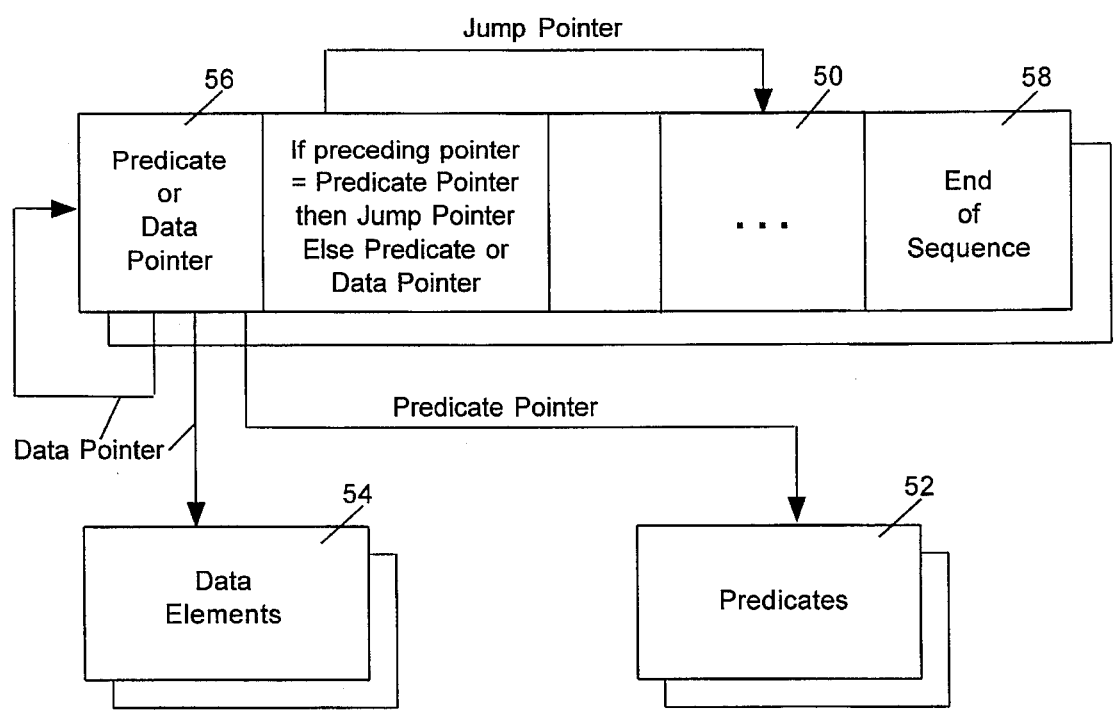
FIG. 5 illustrates the navigation sequence of the present invention and its relationship with data elements and predicates.
Figure 6:
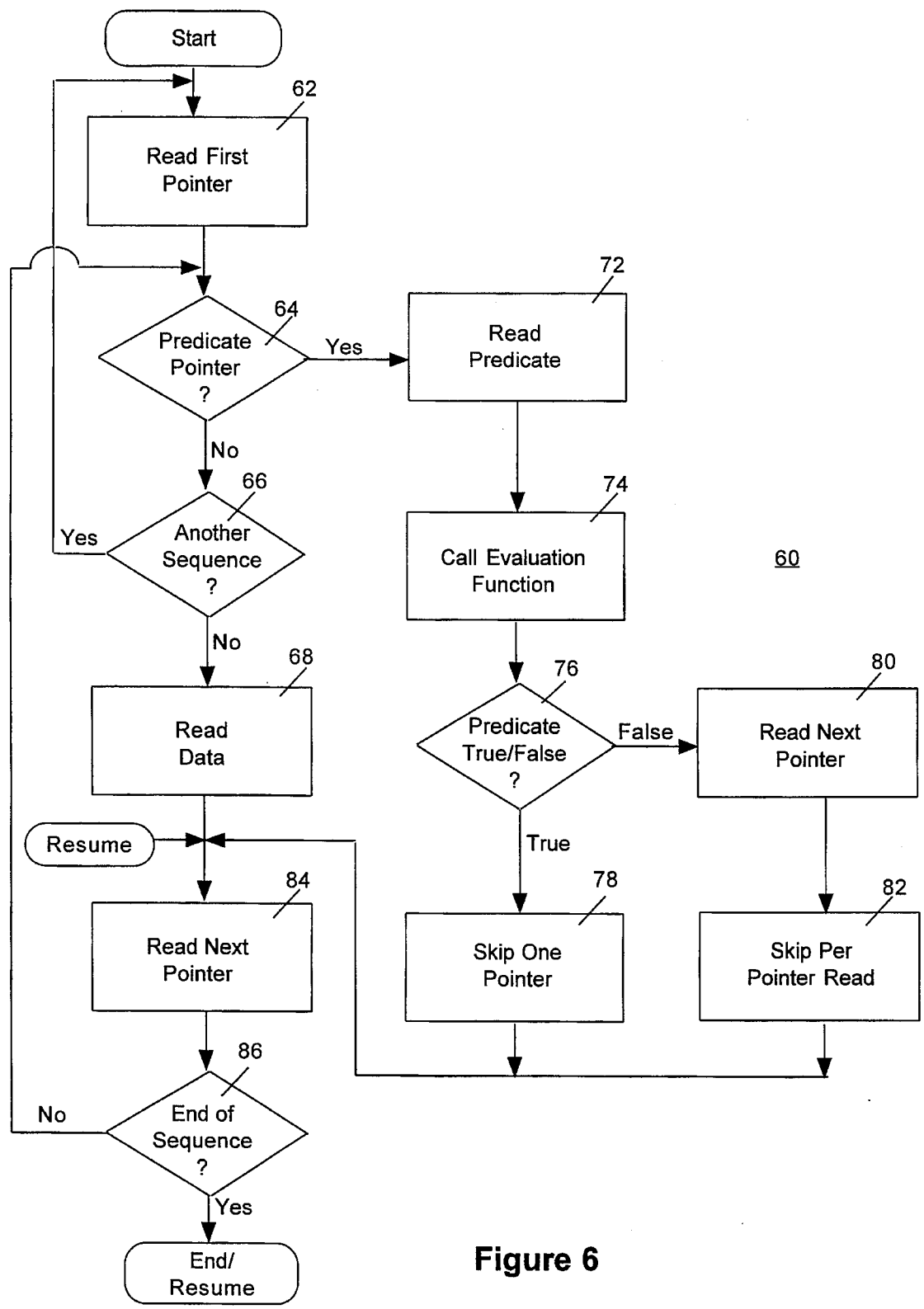
FIG. 6 illustrates the operational flow for selectively traversing a navigation sequence under the present invention.

FIGS. 5–7, three block diagrams, illustrate the nested meta data structures of the model databases of the present invention including the predicates and traversal algorithm. As illustrated in FIG. 5, the building blocks for the nested meta data structures of the present invention are navigation sequences 50, predicates 52, and data elements 54. The data elements 54 are the data about the device types being modeled. The navigation sequences 50 are used to control the conditional retrieval of the data elements 54, and the predicates 52 are used to control the traversal of the navigation sequence 50, thereby controlling the conditional retrieval of the data elements 54.

Each navigation sequence 50 is an ordered combination of pointers 56, and there are three kinds of pointers, predicate pointers, jump pointers, and data pointers. The predicate pointers point to the predicates 52, whereas the data pointers point to the data elements 54 or other navigation sequences 50. The jump pointers point to other predicate or data pointers 56 within the navigation sequence 50. Preferably, the pointers 56 are of the same sizes. As illustrated, the first pointer of a navigation sequence 50 is either a predicate or data pointer. Each succeeding pointer is a jump pointer if the preceding pointer is a predicate pointer, otherwise, it is either another predicate or data pointer. In other words, a predicate pointer is always followed by a jump pointer, whereas a data pointer or a jump pointer is never followed by a jump pointer.

The pointers 56 may be differentiated in a variety of manners including but not limited to self-identifying leading bit(s). However, for compactness and efficiency, it is preferred that the predicate pointers are differentiated from the other pointers contextually by storing all the predicates in a predicate area of a model database of a known address range. It will be appreciated that once the predicate pointers are differentiable, the data pointers and the jump pointers are also differentiable from each other, since the jump pointers always follow the predicate pointers. Similarly, whether the object of a data pointer is a data element 54 or another navigation sequence 50 they may be differentiated in a variety of manners including but not limited to a self-identifying leading bit(s). However, for compactness and efficiency, it is also preferred that the object of a data pointer is distinguished contextually in view of the meta data structure being traversed—for example, in a Centrex application, whether the meta data structure being traversed is modeling telephone sets or telephone features.

As illustrated, the end of a navigation sequence 50 is denoted by an end of sequence marker 58. However, it will be appreciated that the end of a navigation sequence 50 may be denoted in a variety of other manners including but not limited to the provision of the size of the navigation sequence 50 or the number of pointers in the navigation sequence 50, at the beginning of the navigation sequence 50. Similarly, the size of a predicate 52 may be denoted in a variety of manners including but not limited to the provision of the size of the predicate 52 at the beginning of the predicate 52. Likewise, the size of a data element 54 may be denoted in a variety of manners including but not limited to the provision of the size of the data element 54 at the beginning of the data element 54. Preferably, for compactness and efficiency, the sizes of the data elements 52 are determined contextually in view of the meta data structure being accessed.

A navigation sequence 50 is generally traversed in a forward manner from the first pointer towards the last pointer. However, it will be appreciated that because the jump pointer may take on negative values, a navigation sequence 50 may be traversed in a zig-zag manner going backward as well as forward. Additionally, traversal may start at the middle of a navigation sequence 50, as long as the effective first pointer is either a predicate or data pointer, and not a jump pointer.

As illustrated in FIG. 6, traversal of a navigation sequence 50 starts with the reading of the "first" pointer, step 62. Upon reading the "first" pointer, step 62, a determination is made whether the pointer is a predicate pointer, step 64. If the pointer is determined to be a predicate pointer, the predicate is read, step 72. Then, the corresponding evaluation function is called to evaluate the predicate in view of operational data, step 74. If the predicate is evaluated to be true, the next pointer (a jump pointer) in the forward direction is skipped, step 78, otherwise, the next (jump) pointer in the forward direction is read, step 80, and a variable number of pointers is skipped in either the forward or backward direction, step 82, depending on the value of the (jump) pointer read.

On the other hand, if the pointer is determined to be a data pointer at step 64, a determination is made whether the data pointer is pointing to another navigation sequence 50, step 66. If the data pointer is pointing to another navigaiton sequence 50, recursive traversal of that sequence will be started. When recursive traversal of that sequence is terminated, traversal of this sequence resumes. Note that recursive traversal of the other sequence may lead to recursive traversal of one or more other sequences. In like manner, recursive traversal of an immediately preceeding sequence will resume whenever the recursive traversal of the immediately succeeding sequence terminates.

If the data pointer is not pointing to another navigation sequence 50, the data element is read, step 68.

Upon either making the appropriate skips at steps 78 or 82, or reading the data element at step 68, or resumption of traversal, the next pointer is read, step 84, and a determination is made whether the end of the navigation sequence 50 has been reached, step 86. If the end of the navigation sequence 50 has not been reached, traversal continues at step 64 as described earlier. It will be appreciated that steps 84 and 86 may be reversed, depending the manner in which the end of a navigation sequence 50 is denoted.

Upon determining that the end of the navigation sequence 50 has been reached at step 86, traversal of the navigation sequence 50 is terminated.

It will be appreciated that a very small amount of code is necessary to implement the above described traversal algorithm. Because of the inherent recursive nature of the data searches during device emulation, it is preferred that the traversal algorithm be implemented in a common traversal routine accessible to all model database accessing programs. Whatever contextual information is required about a particular traversal of a particular meta data structure, it can be provided at the invocation of the common traversal routine.

Figure 7A:
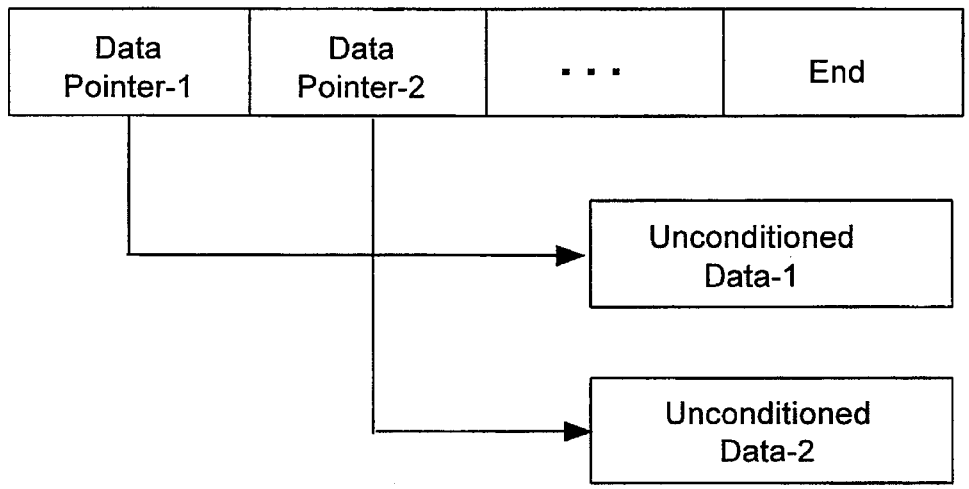
FIGS. 7a–7d illustrate exemplary meta data structures of model databases of the present invention.
Figure 7B:
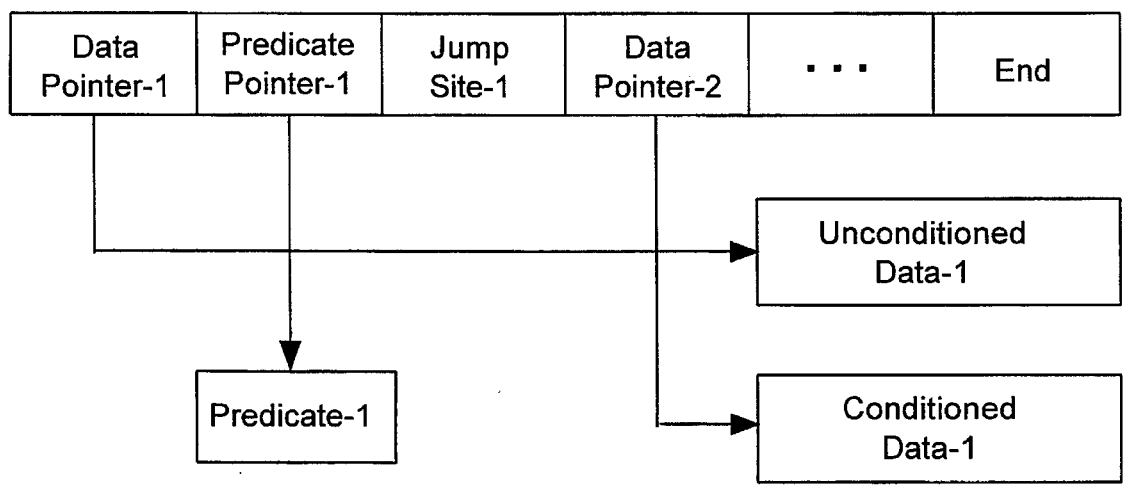
Figure 7C:
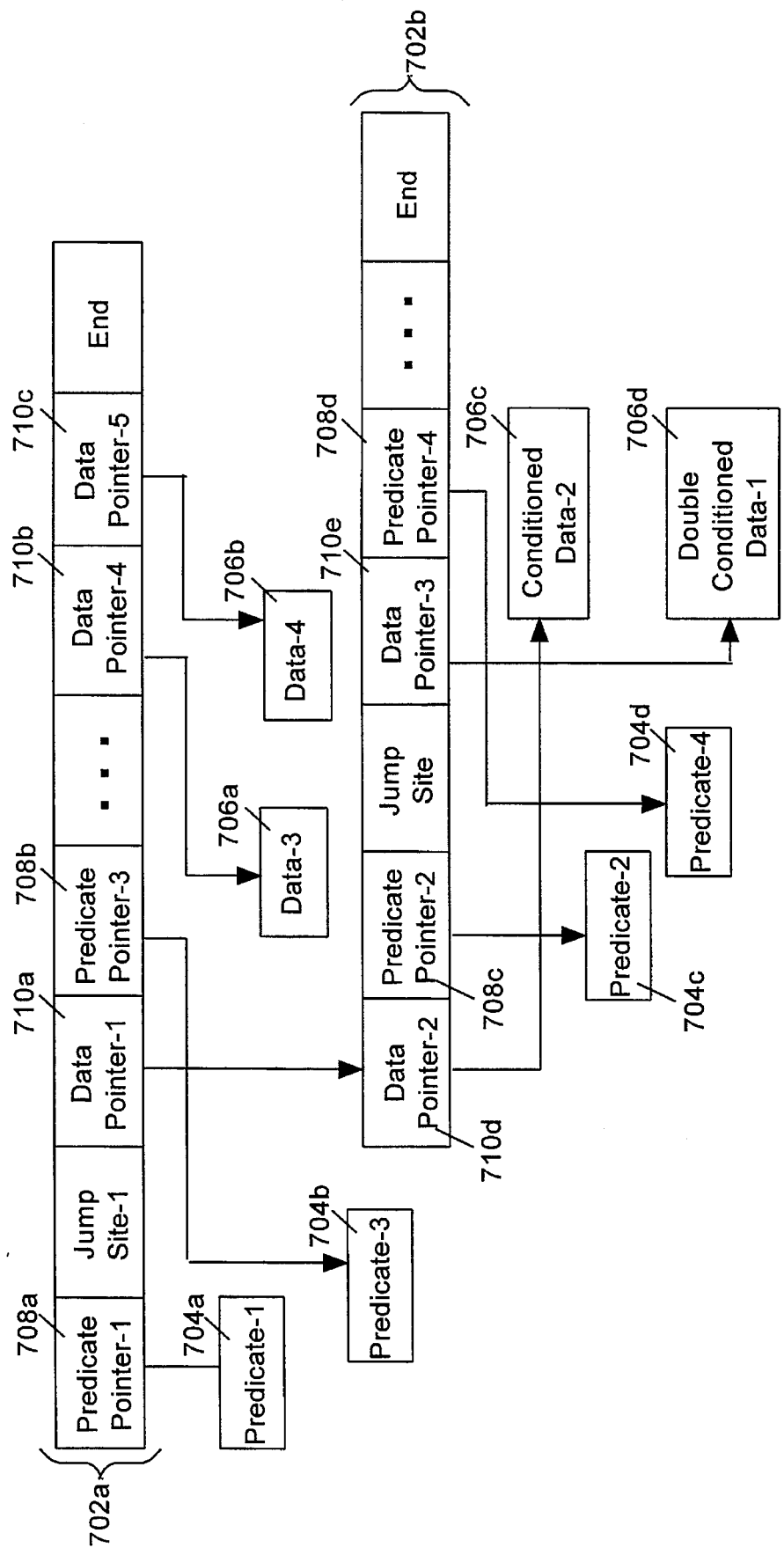
Figure 7D:
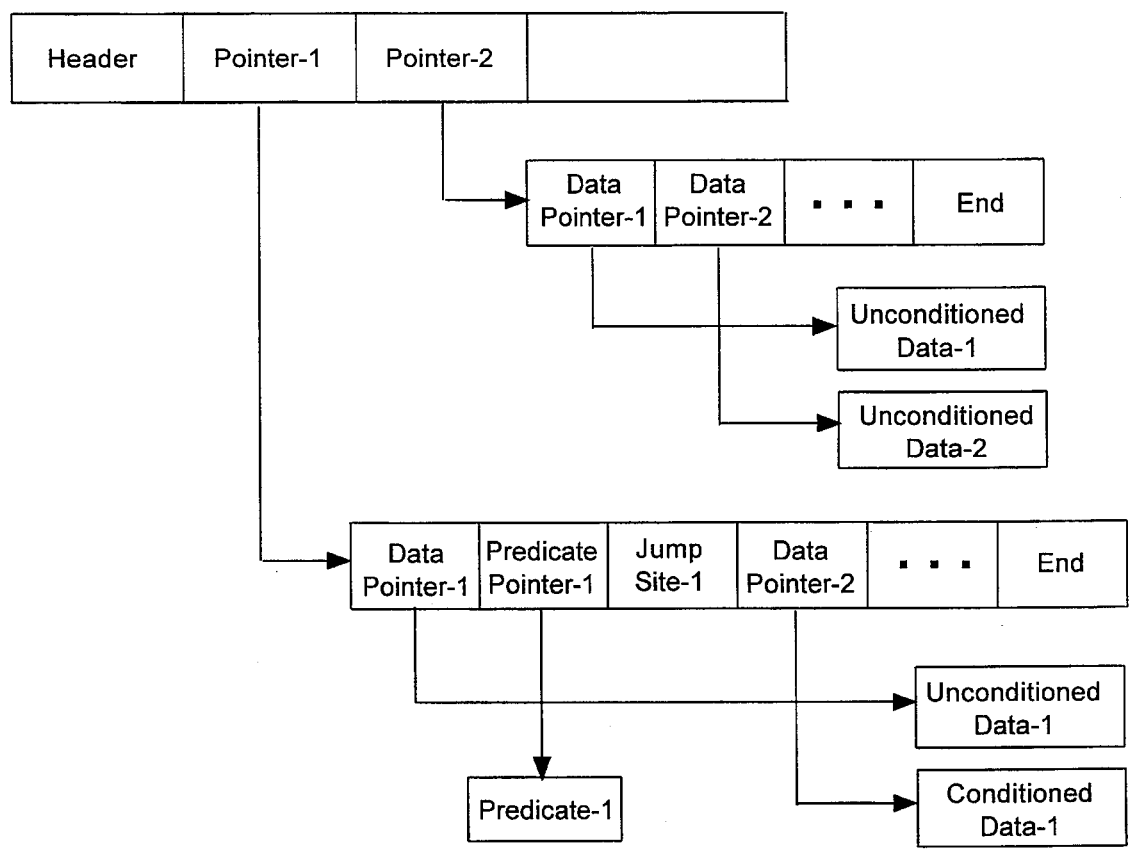

FIGS. 7a–7d illustrate a number of exemplary meta data structures that can be formed using the basic building blocks illustrated in FIG. 5, i.e. the navigation sequences 50, the predicates 52, and the data elements 54. FIG. 7a illustrates an exemplary simple meta data structure with one navigation sequence, two unconditioned data elements and no predicate. FIG. 7b illustrates an exemplary slightly more elaborate meta data structure with one navigation sequence, one predicate, an unconditioned and a conditioned data element. FIG. 7c illustrates an exemplary more elaborate meta data structure with two nested navigation sequences, two predicates, a conditioned and a double conditioned data element. FIG. 7d illustrates the employment of a header with pointers to combine the meta data structure illustrated in FIGS. 7a–7b into one compound meta structure. It will be appreciated that even more complex nested meta data structures can be formed. Yet all of these meta data structures can be searched and have data conditionally retrieved, using the consistent traversal algorithm illustrated in FIG. 6 recursively, from the simplest ones with no nesting level to the highly complex ones with multi-levels of nesting.

FIG. 8, a block diagram, illustrates one embodiment of the model compiler. For this embodiment, the model compiler 40 comprises a parser and list (P&L) builder 88 and a database (DB) builder 90. The P&L builder 88 parses the rules and behaviors specifications 38, analyzes the information, and organizes them into a number of lists 92–102. In particular, it maintains a database master list 92 for tracking all members of the database including the other work lists 94–102. The data lists 94 are used to store the data about the device types being modeled. The predicate list 96 is used to store the predicates synthesized. The data relationship list 98 is used to store and track all data dependencies including assignability, accessibility, prerequisites and incompatibilities. The fixup list 100 is used to track the elements of the database whose positions cannot be determined during the parsing and list building phase. Lastly, the build list 102 is a list of intermediate structures that store elements of the database. Every element of the final database will have an intermediate representation in the build list. The fixup list refers to locations within the build list. The DB builder 90 then builds the model databases 42 using the information stored in these lists 92–102 by the P&L builder 88.

Parsing techniques, syntactical and semantics analysis, list constructions and reductions, are all well known in the art of compiler technology. Thus, except for their applications to compiling device type model databases, the two builders 88 and 90, and the various lists 92–102 will not be otherwise described in further detail. Their applications to compiling device type model databases will be described through an exemplary compilation illustrated in FIGS. 9e–9h.

FIGS. 9a–9q, 17 diagrams, illustrate an exemplary application of the present invention to Centrex management. For ease of understanding, the exemplary application has been purposely kept unrealistically simple; nevertheless, a person skilled in the art will appreciate that the exemplary application succinctly demonstrates the teachings and the practice of the present invention.

FIGS. 9a–9b illustrate the specification of rules and behaviors for the telephone sets and telephone buttons in this exemplary Centrex management application, 104–108. For simplicity, there are only two types of telephone sets, Basic Telephone Sets (BTS) 104, and Meridian Business Telephone Sets (M5209) 106, and three types of telephone buttons, a Lamp type, a NoLamp type, and a Code type 108. As illustrated, a BTS 104 has one button, defined as a Code type, whereas an M5209 106 has three buttons (1–3), and the first button is defined as a Code type, the second button is defined as Lamp type, and the third button is defined as NoLamp type. In defining a button type, we take account for the situation where features exist that can only be assigned to a particular button type. Furthermore, each set is limited to a maximum of 20 features in the case of a BTS 104, and 64 features in the case of an M5209 106.

FIGS. 9c–9d illustrate the specification of rules and behaviors for the telephone features in this exemplary Centrex management application. For simplicity, there are only three features "Call Transfer"(CXR), "Telephone Number"(TN), and "Three Way Conferencing" (3WC), 110–114. From the absence of conditions at the "DefFeature" lines, 116–117 we see features CXR and TN are valid for all sets, all versions of switch software (also referred to as "generic"), and all contexts (i.e., switch/EXTERNAL or user/INTERNAL), whereas the feature 3WC has a restriction on the set type, as shown by the set predicate. For the purpose of this example, the values of generic are numeric, such as 26, 32; and the values of context are either "external" for switch or "internal" for user.

The exemplary specification illustrated in FIG. 9c also indicates for a BTS, the CXR feature may be assigned to the TN feature, whereas for a M5209, the CXR feature may be assigned to a button that has a lamp, 122. From a BTS, access to the CXR feature is by code, whereas from a M5209, access is by button, 128. Also, for a M5209, the CXR feature is incompatible with the 3WC feature, 134. Additionally, nine parameters 140a–140i are defined for the CXR feature, including their prompts, domains, defaults, and patterns. The presence or absence of conditions at the DefParm statements specifies the general conditional or unconditional nature of the parameters. For example, the parameter CXRTYPE 140a applies to all sets and generics, whereas the parameter METHODEBS 140i applies only to M5209 sets and generics greater than or presence or absence of Next statements specifies the relative ordering of the parameters. For example, for parameter CXRTYPE 140a, if generic is less than 26, the context is internal, and CXRTYPE is "Other", then the next parameter is ORGINTER, whereas, if generic is less than 26, the context is external, and CXRTYPE is "Custom", then the next parameter is also ORGINTER. On the other hand, if generic is greater than or equal to 26, the context is internal, and CXRTYPE is "Other", then the next parameter is ORGINTER, otherwise it is CXRRCL, whereas, if generic is greater than or equal to 26, the context is external, and CXRTYPE is "Custom", then the next parameter is also ORGINTER, otherwise it is CXRRCL.

FIG. 9d shows the minimal definition used for the features TN and 3WC in the exemplary model database.

FIGS. 9e–9h illustrate a number of exemplary list structures used during an exemplary compilation of the above described exemplary specifications. For ease of understanding, only a selected number of illustrative exemplary list structures are described; nevertheless, a person skilled in the art will appreciate how the P&L builder 88 maintains and tracks the data and their relationships, thereby allowing the DB builder 90 to resolve their relative locations, build the meta data structures, and lay them into the model databases.

Figure 9E:
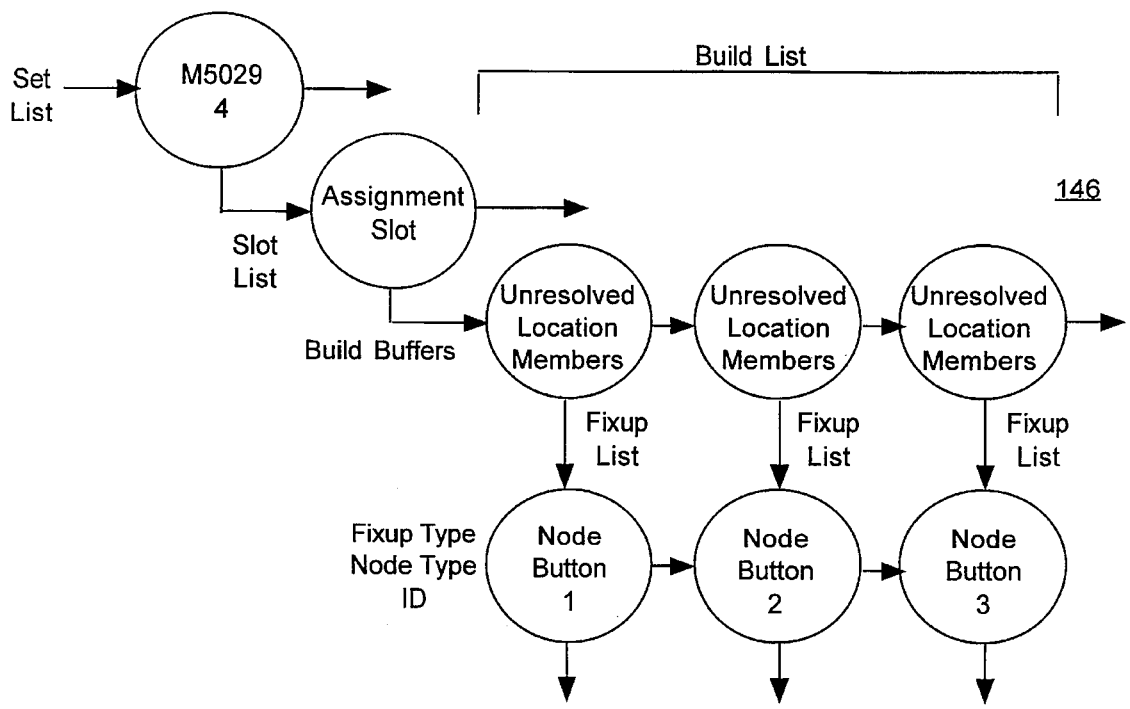
FIGS. 9a–9q illustrate an exemplary application of the present invention, including exemplary specifications, exemplary list structures used during compilation, an exemplary resulted model database, and exemplary accesses to the exemplary database.

As illustrated in FIG. 9e, based on the above exemplary specifications, a Set list will be created and maintained by the P&L builder 88. The Set list will have M5209 as one of its members. Among other information, the M5209 member will have a link to an assignment relationship (or assignment slot) of a relationship list (or slot list). For this exemplary Centrex management application, there are three types of data relationships (or slot types). In addition to the assignment slot type, there are the incompatibility and prerequisite slot types. Among other information, the assignment slot type will be linked to various unresolved location members of a build list. A build list is another name of a list of unresolved location members. The unresolved location members will in turn be linked to corresponding button members in the fix up list. The fix up list contains references to the type and nature of the data that the members must point to when compilation is complete. The unresolved location members are resolved after all data elements and relationships have been identified and properly linked.

Figure 9F:
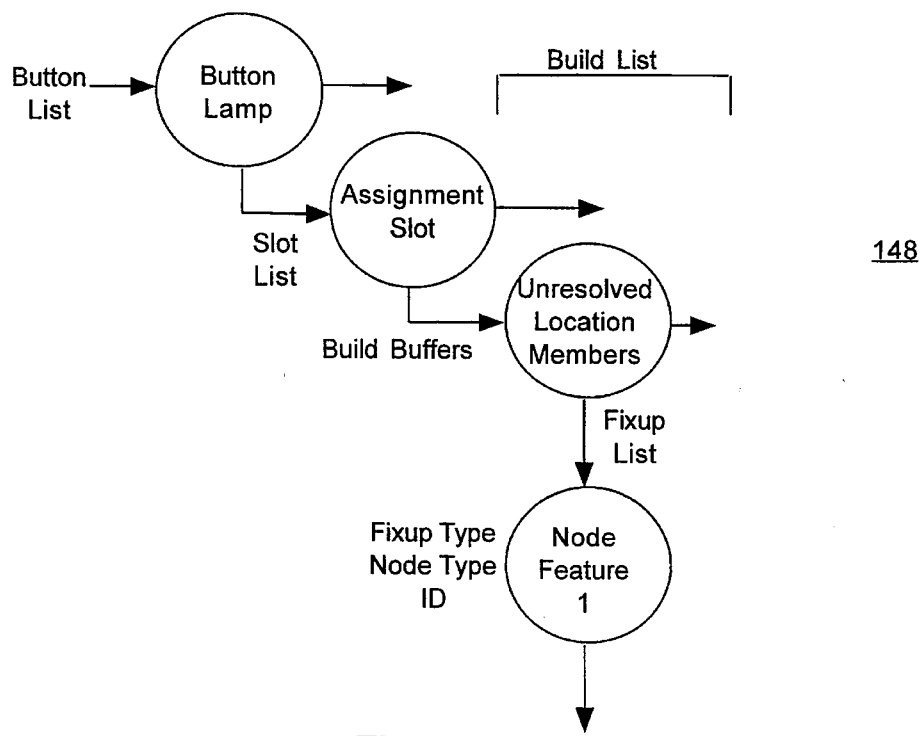

Similarly, as illustrated in FIG. 9f, based on the above exemplary specifications, a Button list will be created and maintained by the P&L builder 88. The Button list will have Lamp as one of its members. Among other information, the Lamp member will be linked to an assignment slot type of a slot list. Among other information, the assignment slot type will be linked to an unresolved location member of a build list. The unresolved location member will in turn be linked to a corresponding feature member in the fixup list. The unresolved location member is also resolved after all data elements and relationships have been identified and properly linked.

Figure 9G:
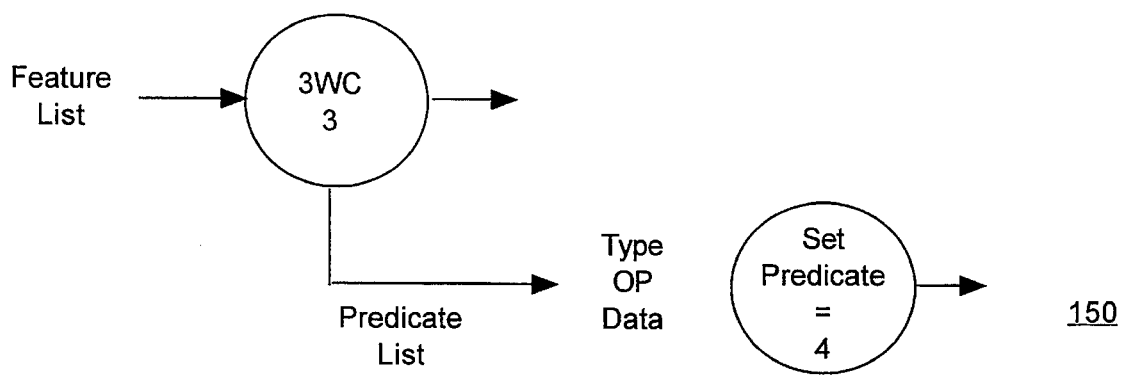

Likewise, as illustrated in FIG. 9g, based on the above exemplary specifications, a Feature list will be created and maintained by the P&L builder 88. The Feature list will have 3WC as one of its members. Among other information, the 3WC member will be linked to a set predicate of a predicate list.

Figure 9H:
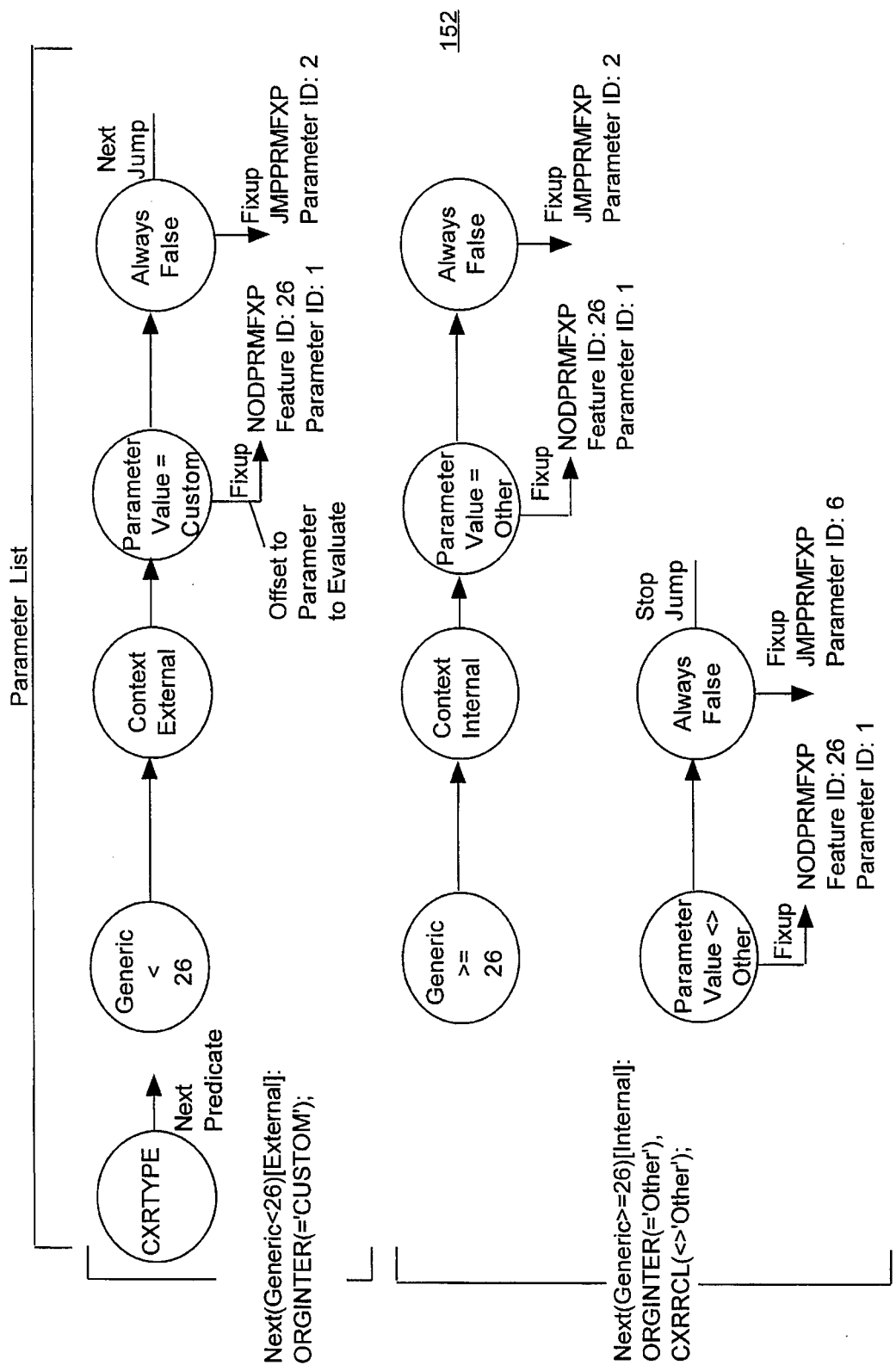
Figure 9J:
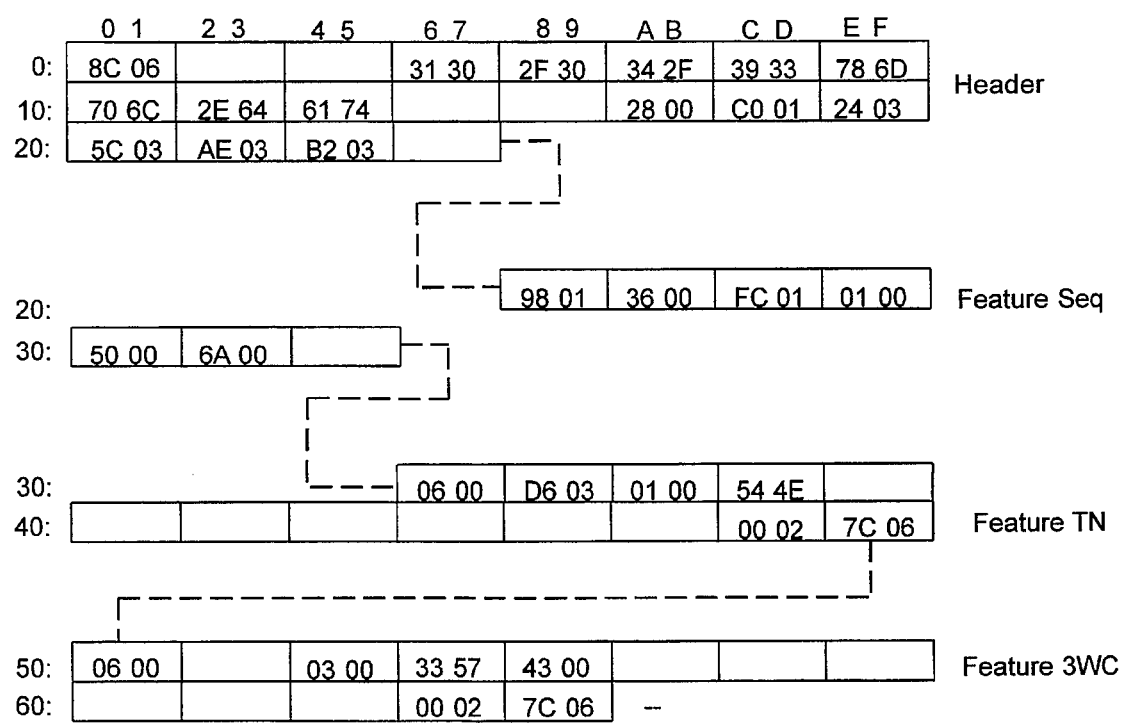
Figure 9M:
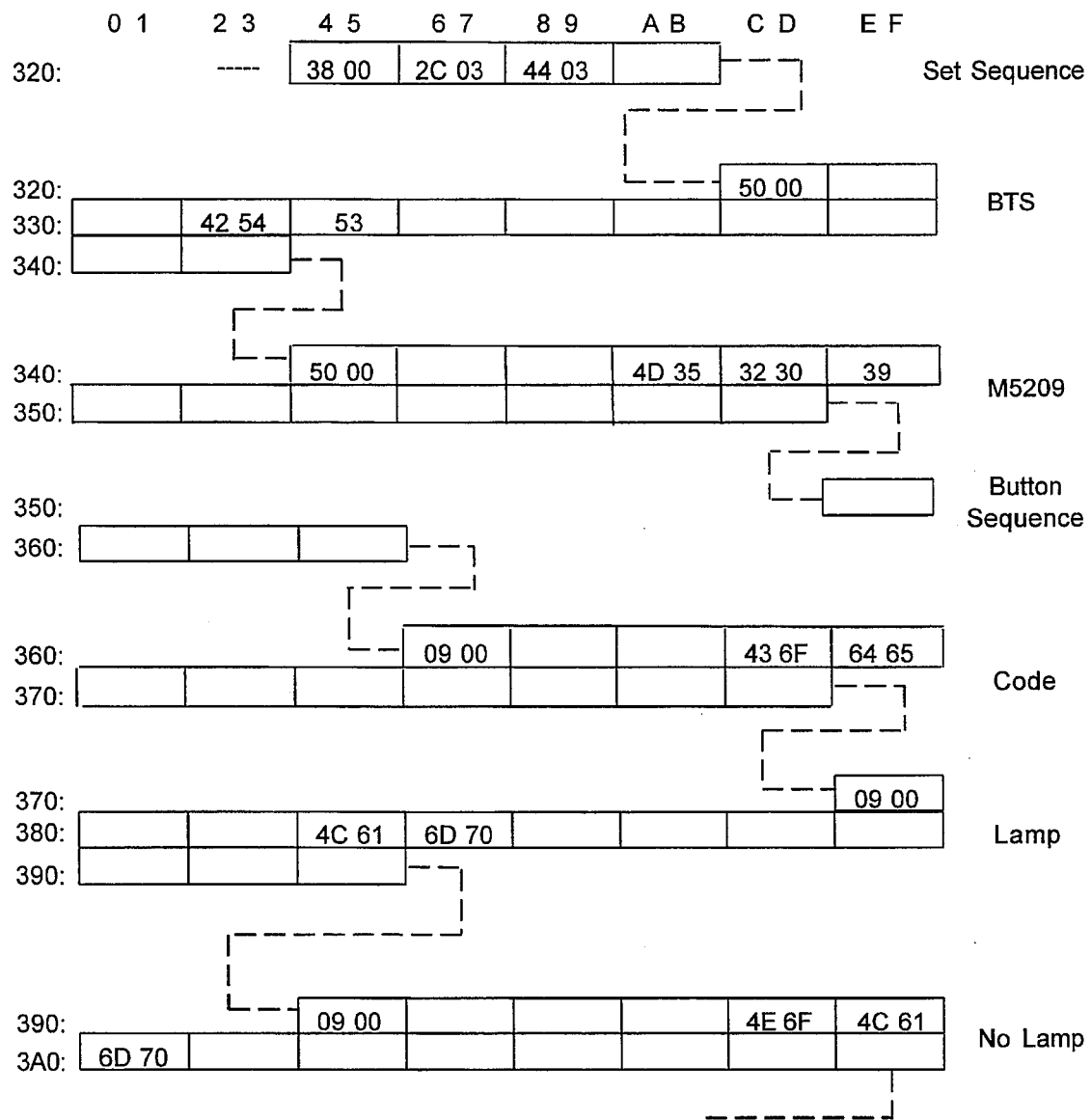
Figure 9N:
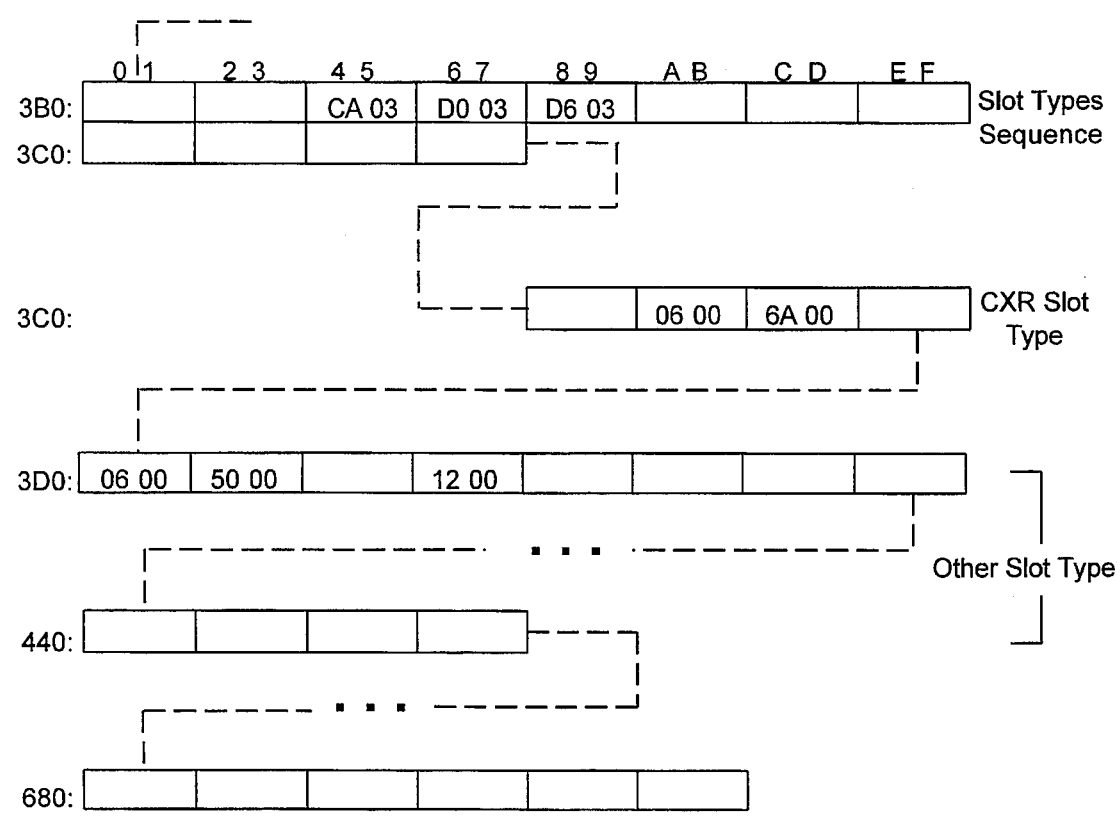
Figure 9O:
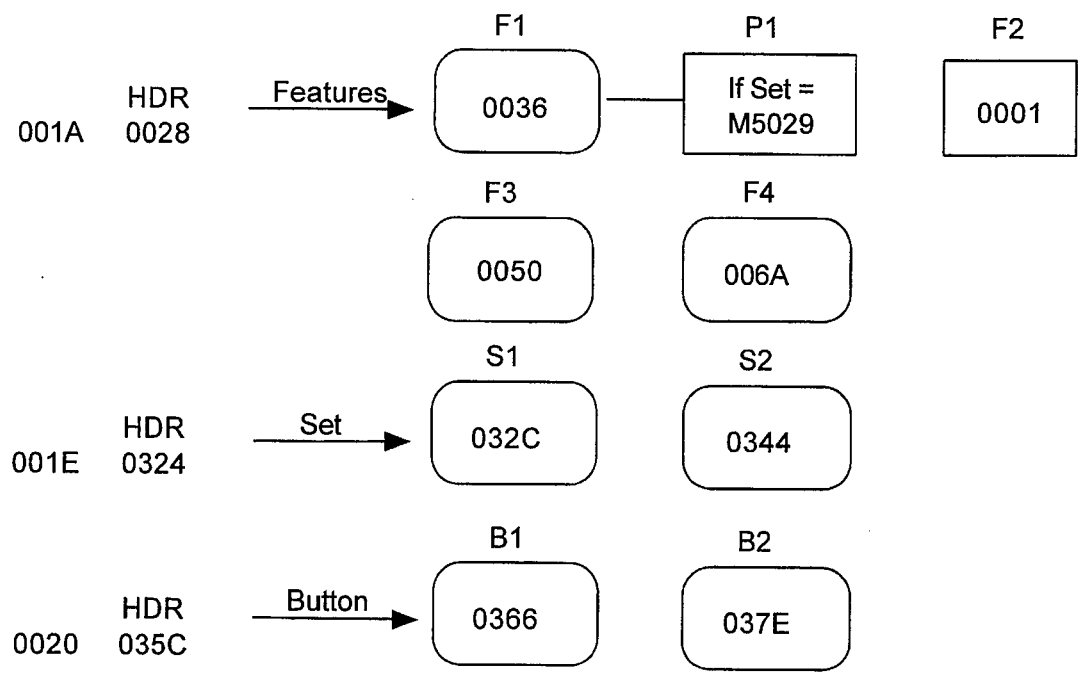
Figure 9P:
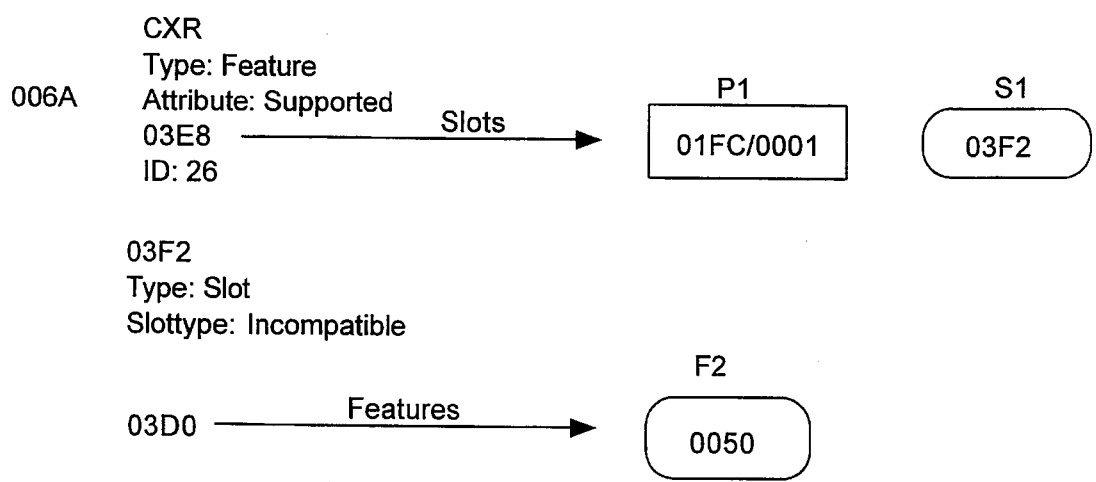
Figure 9Q:
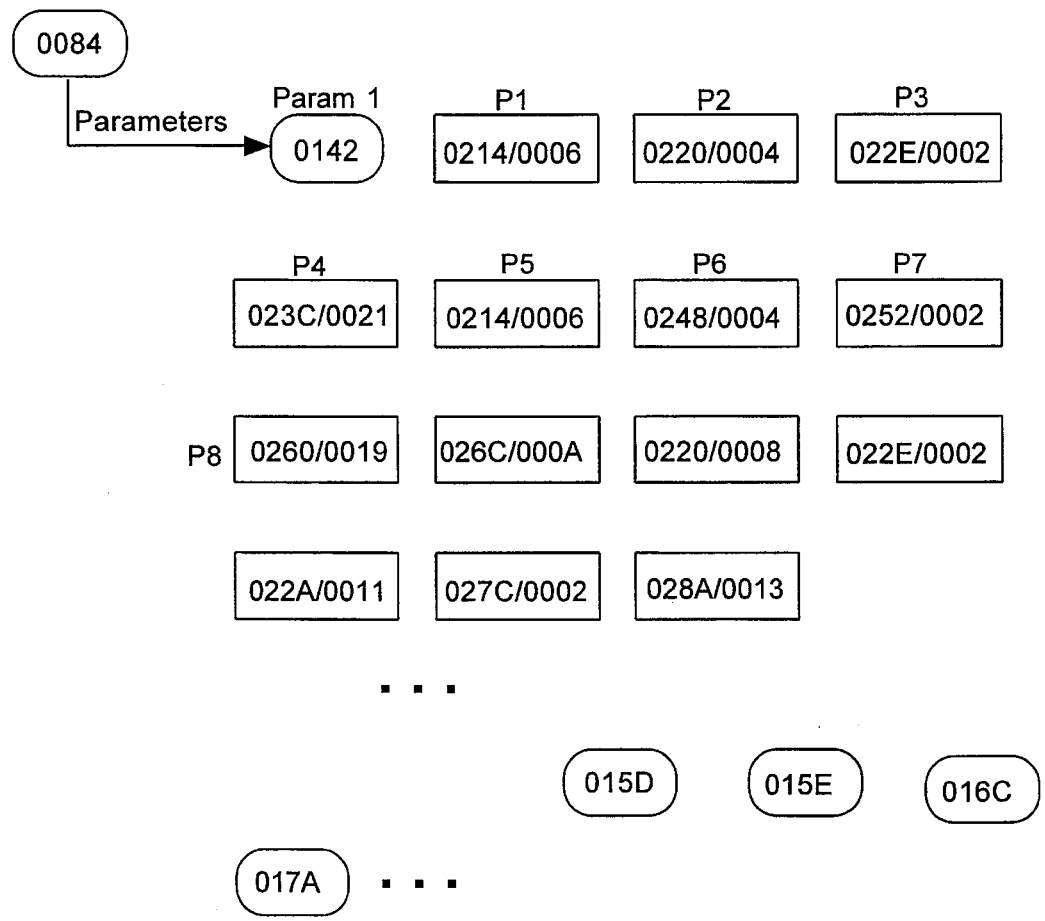

Lastly, as illustrated in FIG. 9h, based on the above exemplary specifications, a Parameter list will be created and maintained by the P&L builder 88 and linked to the CXR member of the Feature list. The Parameter list will have CXRTYPE as one of its members. Among other information, the CXRTYPE member will be linked to a generic predicate of a Next Predicate list, which will in turn be linked to a context predicate. The predicates will be linked from one to another as illustrated in accordance to the conditional relationships specified.

FIGS. 9i and 9j–9n illustrate the exemplary model database built by the DB builder 90 from the various lists built and maintained by the P&L builder 88. For ease of understanding, only some of the addresses, pointers and individual data are shown. All addresses, pointers as well as individual data values shown in these six figures are in hexadecimals. The addresses and pointers are all two bytes long, and by convention, the higher address byte is the most significant byte, whereas the lower address byte is the least significant byte. For example, if an offset value is shown as E8 03, the offset is 3E8. To find this location in the model database shown in FIG. 9i, first the row 3E0 is found in the diagram. The 8 identifies the column, giving the location within that row. Location 3E8, therefore, has the value 12 00, or the number 12.

To further improve the compactness of the exemplary database and traversal efficiency, additional structural disciplines are imposed when laying the exemplary meta data structures in the exemplary database. However, based on the descriptions to follow, it will be appreciated that the segmentation of the model database and the provision of headers are merely two of many structural approaches that allow contextual differentiation of the predicate pointers and the nature of the data, thereby making the model database even more compact and efficient for traversal. The present invention may be practiced without these additional structural disciplines, or with more.

For this exemplary model database, it is divided into five segments with a segment header provided at the top of the segments. More specifically, the segment header is located at address [0000: 0027]. The first segment is for the features and their parameters, located at address [0028: 01BF]. The second segment is for the predicates, located at address [01C0: 0323]. The third segment is for the sets, located at address [0324: 035B]. The fourth segment is for the buttons, located at address [035C: 03AD]. Lastly, the fifth segment is for the relationship types or slot types, located at address [03AE: 0447]. The starting addresses of the segments, i.e. 0028, 01C0, 0324, 035C, and 03AE, are provided at predetermined locations in the segment header [001A: 0023]. The sizes of the segments, i.e. 0198, 0164, 0038, 0052, and 009A, are provided at the first two bytes of each of the segments. Thus, the ending addresses of the segments, i.e. 0027, 01BF, 0323, 035B, 03AD, and 0447 can be determined through their starting addresses and their sizes. Alternatively, except for the last segment, each ending address can also be determined from the starting address of the next segment.

Additionally, feature headers are provided to the features' meta data structures. Each feature header comprises pointers to its slot type and parameter navigation sequences at predetermined offsets in the header.

The exemplary meta data structures and these additional structural disciplines will best be understood through a number of exemplary accesses. As will be obvious from these access descriptions to follow, some of the exemplary meta data structures span multiple segments.

FIGS. 9o–9q illustrate a number of exemplary accesses. All addresses, pointers as well as individual data values shown in these three figures are also in hexadecimals and two bytes long. However, the addresses and pointers are shown with the most significant byte at the left, and the least significant byte on the right.

FIG. 9o illustrates three simple exemplary accesses for features, sets, and buttons. To access the features, at address 001A, a predetermined location in the segment header, the starting address 0028 of the feature segment is obtained. Thus, traversal of the navigation sequence for all features starts at address 002A, two bytes after the starting address, since the size of the feature segment occupies the first two bytes. At address 002A, the first pointer 0036 is read. The pointer is a data pointer because it does not point to a location within the predicate segment. Furthermore, the data pointer is a feature data pointer, because by predetermined convention the data pointer in the navigation sequence for all features does not point to another navigation sequence. Therefore, the data values "54 4E 00", denoting the first feature "TN" at a predetermined offset from the pointed to address 0036, are unconditionally retrieved.

Then the traversal continues, and the next pointer 01FC at address 002C is read. The pointer is a predicate pointer because it points to a location within the predicate segment. The predicate representing the condition "if set=M5209" is read. The corresponding set predicate evaluation function is called to determine if operationally the management software is working with a M5209 telephone set at this time. If the predicate is evaluated to be true, the next pointer 0001 (a jump pointer) at address 002E is skipped. Instead, the pointer 0050 at address 0030 is read, thus leading to the conditional retrieval of the data values "33 57 43" denoting the second feature "3WC" at a predetermined offset from the pointed to address 0050. Next, the pointer 006A at address 0032 is read, which leads to the unconditional retrieval of the data values "43 58 52" denoting the third feature "CXR" at a predetermined offset from the pointed to address 006A. Finally, the end of the navigation sequence is encountered at address 0034, terminating the traversal.

On the other hand, if the predicate at address 01FC is evaluated to be false, the next pointer 0001 (a jump pointer) at address 002E is read, and one pointer is skipped accordingly. As a result, the second feature "3WC" will not be retrieved. Next, the pointer 006A at address 0032 is read, which leads to the conditional retrieval of the data values "43 58 52" denoting the third feature "CXR" at a predetermined offset from the pointed to address 006A. Finally, the end of the navigation sequence is encountered at address 0034, terminating the traversal.

Similarly, to access sets, at address 001 E, also a predetermined location in the segment header, the starting address 0324 of the set segment is obtained. Thus, traversal of the navigation sequence for all sets starts at address 0326, two bytes after the starting address, since the size of the set segment occupies the first two bytes. At address 0326, the first pointer 032C is read. The pointer is a data pointer because it does not point to a location within the predicate segment. Furthermore, the data pointer is a set data pointer, because by predetermined convention the data pointer in the navigation sequence for all sets does not point to another navigation sequence. Therefore, the data values "42 54 53 00 00", denoting the first set type "BTS" at a predetermined offset from the pointed to address 032C, are unconditionally retrieved.

Then the traversal continues, and the next pointer, 0344 at address 0328, is read. Again the pointer is a data pointer, leading to the unconditional retrieval of the data values "4D 35 32 30 39", denoting the second set type "M5209" at a predetermined offset from the pointed to address 0344. Finally, the end of the navigation sequence is encountered at address 032A, terminating the traversal.

Likewise, to access buttons, at address 0020, also a predetermined location in the segment header, the starting address 035C of the button segment is obtained. Thus, traversal of the navigation sequence for all buttons starts at address 035E, two bytes after the starting address, since the size of the button segment occupies the first two bytes. At address 035E, the first pointer 0366 is read. The pointer is a data pointer because it does not point to a location within the predicate segment. Furthermore, the data pointer is a button data pointer, because by predetermined convention the data pointer in the navigation sequence for all buttons does not point to another navigation sequence. Therefore, the data values "43 6F 64 65 00 00", denoting the first button type "Code" at a predetermined offset from the pointed to address 0366, are unconditionally retrieved.

Then the traversal continues, and the next pointer, 037E at address 0360, is read. Again the pointer is a data pointer, leading to the unconditional retrieval of the data values "4C 61 6D 70 00 00", denoting the second button type "Lamp" at a predetermined offset from the pointed to address 0360. Next, the pointer 0396 at address 0362 is read. Again the pointer is a data pointer, leading to the unconditional retrieval of the data values "4E 6F 4C 61 6D 70", denoting the third button type "NoLamp" at a predetermined offset from the pointed to address 0396. Finally, the end of the navigation sequence is encountered at address 0364, terminating the traversal.

FIG. 9p illustrates an exemplary access to relationship types or slot types. For the exemplary Centrex management application, there are two kinds of access to slot types. In the first kind, a particular slot type is accessed to determine certain information about a feature, a set, or a button. For example, as part of responding to a request to add feature CXR to a M5209 phone, the incompatibility slot type of feature CXR is accessed to retrieve the incompatible features. In the second kind, a particular slot type is accessed because similar slot types of all features except a particular feature, or all sets except a particular set, or all buttons except a particular button, are being accessed to determine if the particular feature, or the particular set, or the particular button is mentioned. For example, as part of responding to a request to delete feature CXR from a M5209 phone, the prerequisite slot types of all other features are accessed to determine if CXR is mentioned as a requisite feature. The exemplary access illustrated by FIG. 9p is of the first kind. However, a person skilled in the art will appreciate how an access of the second kind can be similarly accomplished.

Initially, the starting address 006A of feature CXR is located by accessing a predetermined location in the segment header for the starting address of the feature segment, and traversing the feature navigation sequence as described earlier. Upon locating the feature CXR, the pointer to CXR's slot type navigation sequence 03E8 is retrieved at address 006C, a predetermined offset from the starting address 006A of feature CXR. Traversal starts with reading of the first pointer 01FC at address 03EA, also a predetermined offset from the starting address 03E8. The pointer is a predicate pointer, pointing to the same predicate "if set=M5209" described earlier. Thus, the set predicate evaluation function is called accordingly to determine whether operationally the management software is working with a M5209 telephone set at this time.

If the predicate is evaluated to be true, the next pointer 0001 (a jump pointer) at address 03EC is skipped. Instead, the pointer 03F2 at address 03EE is read, thus leading to the conditional retrieval of the data values "0B 01 14 00", denoting incompatibility slot type, and the incompatibility feature list pointer 03D0 at address 03F6. In turn, it leads to the retrieval of the incompatibility feature pointer 0050 at address 03D2. At a predetermined offset from the pointed to address 00050, the data values "33 57 43" are retrieved identifying the incompatibility feature as "3WC". As traversal of CXR's slot type navigation sequence continues at address 03F0, the end of the navigation sequence is encountered, terminating the traversal.

If the predicate at address 01FC is evaluated to be false, the next pointer 0001 (a jump pointer) at address 03EC is read, and one pointer is skipped accordingly. As a result, the pointer to the incompatibility slot type will not be retrieved. Instead, the end of the navigation sequence is encountered at address 03FO, terminating the traversal.

FIG. 9*q* illustrates an exemplary access for parameters of a feature, more specifically, for parameters of feature CXR. Initially, the starting address 006A of feature CXR is located by accessing a predetermined location in the segment header for the starting address of the feature segment, and traversing the feature navigation sequence as described earlier. Upon locating the feature CXR, the pointer to CXR's parameter navigation sequence 0084 is retrieved at address 007E, a predetermined offset from the starting address 006A of feature CXR. Traversal starts with reading of the first pointer 0142 at address 0086, also a predetermined offset from the starting address 0084. The pointer is a data pointer, leading to the unconditional retrieval of the first parameter "CXRTYPE" at address [0142:014F].

Traversal resumes at address 0088, leading to the reading of pointer 0214, which is a predicate pointer pointing the predicate "if generic <26". Thus, the generic predicate evaluation function is called accordingly to determine whether the version of the switch software being executed is less than 26 or not. Assuming the predicate evaluates to be true, then the next pointer 0006 (a jump pointer) at address 008A is skipped. Instead, the pointer 0220 at address 008C is read, which is a predicate pointer pointing to the predicate "if context is internal". Thus, the context predicate evaluation function is called accordingly to determine whether operationally the management software is dealing with the user. Assuming this time the predicate is evaluated to be false, the next pointer 0004 (a jump pointer) at address 008E is read, and four pointers are skipped accordingly.

Traversal now continues at address 0098, leading to the reading of pointer 0214, which is a predicate pointer pointing to the same predicate "if generic <26". Thus, the generic predicate evaluation function is called accordingly again. Since we already assumed that this predicate evaluation function will be evaluated to be true during this access, traversal continues then at address 009C. Thus, the pointer 0248 is read, which is a predicate pointer pointing to the predicate "if context is external". Since we assumed earlier the predicate "if context is internal" will be evaluated false, the predicate "if context is external" will be evaluated true then.

Traversal now continues at address 00A0, leading to the reading of pointer 0252, which is a predicate pointer pointing to the predicate "if CXRTYPE=custom". Thus, the parameter predicate evaluation function is called accordingly. Assuming the predicate is evaluated to be true, traversal continues then at address 00A4. Thus, the pointer 0260 is read, which is a predicate pointer pointing to a special always false predicate. As a result, the next pointer 0019 (a jump pointer) is read, and 19 pointers are jumped accordingly (25 pointers in decimal values). As a result, the pointer 0150 to the second parameter ORGINTER is located at address 00DA, leading to the conditional retrieval of the ORGINTER at address [0150: 015D].

Traversal then continues again at address 00DC. The subsequent parameters are conditionally retrieved in like manner as parameters CXRTYPE and ORGINTER, until finally the end of the navigation sequence is encountered at address 0140, terminating the traversal.

Thus, from the above description of the present invention and its application, it will be appreciated that the device type model databases under the present invention are very compact, and traversal can be accomplished in a very speedy manner. Additionally, the meta data structures are very flexible allowing modifications to device type models to be easily made. As a result, the present invention achieves the desired advantages over the prior art for modeling and emulating devices in a very complex and dynamic network of telecommunication systems.

Lastly, while the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A method for modeling and emulating a plurality of telecommunication devices of a network of telecommunication systems, wherein said telecommunication devices have device types, said method comprising the steps of:

(a) compiling statements specifying rules and behaviors of said device types into device type model databases and storing said device type model databases using a computer, each of said device type model databases comprising a plurality of meta data structures, each of said meta data structures comprising one or more data elements of one or more of said device types, one or more predicates, and at least one navigation sequence governing retrieval of and physically locating said data elements, said navigation sequences facilitating said governing in conjunction with said predicates; and (b) interpreting user actions and device responses by retrieving appropriate ones of said data elements for said telecommunication devices using a computer, and traversing appropriate ones of said navigation sequences, each navigation sequence being traversed in a predetermined manner.

2. The method as set forth in claim 1, wherein, said step (a) comprises the computer implemented steps of:

(a.1) parsing said statements specifying rules and behaviors, and generating a plurality of intermediate lists, including a data element list linking said data elements of said device types, a predicate list linking predicates embedded in said rules and behaviors, a data relationship list linking data dependencies inferred by said rules and behaviors, a fix up list linking said data elements with unresolved locations in said device type model databases, and a build list for storing working information for building said device type model databases;

(a.2) building said meta data structures using said generated intermediate lists.

3. The method as set forth in claim 1, wherein, each of said compiled navigation sequences in said step (a) is a sequentially ordered combination of pointers comprising one or more data pointers, one or more predicate pointers, and one or more jump pointers, each of said data pointers pointing to either a data element or another navigation sequence of the meta data structure, each of said predicate pointers pointing to a predicate of the same meta data structure, and each of said jump pointers pointing to either a data pointer or a predicate pointer later in order in the navigation sequence, the starting pointer being either a data pointer or a predicate pointer, a pointer following a data pointer being always follow by either another data pointer or a predicate pointer, a pointer following a predicate pointer being always a jump pointer, and a pointer following a jump pointer being either a predicate pointer or a data pointer;

said predetermined manner of traversing a navigation sequence in said step (b) comprises the computer implemented steps of:

(b.1) reading the first pointer of the navigation sequence;

(b.2) determining whether the pointer read is a predicate pointer or a data pointer;

(b.2.1) if the pointer is determined to be a data pointer, further determining if the data pointer is pointing to a data element or another navigation sequence;

(b.2.1.1) if the data pointer is determined to be pointing to a data element, retrieving the data element pointed by the data pointer;

(b.2.1.2) if the data pointer is determined to be pointing to another navigation sequence, traversing the navigation sequence pointed by the data pointer;

(b.2.2) if the pointer is determined to be a predicate pointer, evaluating the predicate pointed by the predicate pointer against real time operational data;

(b.2.2.1) if the predicate is evaluated to be false, reading the next pointer and jumping to the identified data/predicate pointer in accordance to the next pointer read;

(b.2.2.2) if the predicate is evaluated to be true, skipping the next pointer;

(b.3) if the next pointer is not the end of the navigation sequence, reading the next pointer and repeating steps (b.2) and (b.3), conditionally including selected ones of substeps (b.2.1), (b.2.1.1), (b.2.1.2), (b.2.2), (b.2.2.1), and (b.2.2.2) depending on said determinations/evaluations, else terminating the traversal.

4. An apparatus for modeling and emulating a plurality of telecommunication devices of a network of telecommunication systems, wherein said telecommunication devices have device types, said apparatus comprising:

(a) first means for compiling statements specifying rules and behaviors of said device types into device type model databases, each of said device type model databases comprising a plurality of meta data structures, each of said meta data structures comprising one or more data elements of said device types, one or more predicates, and at least one navigation sequence governing retrieval of and physically locating said data elements, said navigation sequences facilitating said governing in conjunction with said predicates;

(b) second means for storing said device type model databases output by said first means;

(c) third means for interpreting user actions and device responses by retrieving appropriate ones of said data elements from said second means for said telecommunication devices by traversing appropriate ones of said navigation sequences, each navigation sequence being traversed in a predetermined manner.

5. The apparatus as set forth in claim 4, wherein, said first means comprises:

(a.1) parsing means for parsing said rules and behaviors, and generating a plurality of intermediate lists, including a data element list linking said data elements of said device types, a predicate list linking predicates embedded in said rules and behaviors, a data relationship list linking data dependencies inferred by said rules and behaviors, a fix up list linking said data elements with unresolved locations in said device type model databases, and a build list for storing working information for building said device type model databases; and (a.2) building means for building said meta data structures using said generated intermediate lists.

6. The apparatus as set forth in claim 4, wherein, said first means constructs a navigation sequence using one or more data pointers, one or more predicate pointers, and one or more jump pointers, each data pointer points to either a data element or another navigation sequence of the same meta data structure, each predicate pointer points to a predicate of the meta data structure, and each jump pointer points to either a data pointer or a predicate pointer of the navigation sequence.

7. The apparatus as set forth in claim 6, wherein, said first means starts each of said navigation sequences with a predicate pointer or a data pointer, said first means always follows a predicate pointer with a jump pointer, a data pointer with either a predicate pointer or another data pointer, and a jump pointer with another predicate pointer or another data pointer.

8. The apparatus as set forth in claim 6, wherein, said first means uses identical number of bytes for each of said data pointers, said predicate pointers, and said jump pointers.

9. The apparatus as set forth in claim 4, wherein, said first means constructs one of said meta data structures of said device type model databases using a navigation sequence and a plurality of data elements of said device types, said navigation sequence having a plurality of data pointers pointing to said data elements.

10. The apparatus as set forth in claim 4, wherein, said first means constructs one of said meta data structures of said device type model databases using a navigation sequence, a plurality of predicates, and a plurality of data elements of said device types, said navigation sequence having a plurality of predicate pointers pointing to said predicates, and a plurality of data pointers pointing to said data elements.

11. The apparatus as set forth in claim 4, wherein, said second means comprises a first and a second storage medium for storing a permanent and a working copy of said device type model databases respectively, said second storage medium having faster access time than said first storage medium.

12. The apparatus as set forth in claim 4, wherein, said third means comprises evaluation means for evaluating said predicates against real time operational data.

13. The apparatus as set forth in claim 12, wherein said predicates have predicate types, and said evaluation means comprises an array of evaluation functions with each evaluation function evaluating predicates of a particular predicate type.

14. The apparatus as set forth in claim 4, wherein, said third means differentiates a predicate pointer from a data pointer contextually, and differentiates whether a data pointer points to a data element or another navigation sequence by predetermined convention.

15. An apparatus for modeling and emulating telephone sets of a network of telecommunication systems, wherein said telephone sets have telephone set types, said apparatus comprising:

(a) first means for compiling statements specifying rules and behaviors of said telephone set types into a telephone set type model database, said telephone set type model databases comprising a plurality of meta data structures, each of said meta data structures comprising one or more data elements of said telephone set types, one or more predicates, and at least one navigation sequence governing retrieval of and physically locating said data elements, said navigation sequences facilitating said governing in conjunction with said predicates;

(b) second means for storing said telephone set type model database output by said first means; and (c) third means for interpreting user actions and telephone set responses by retrieving appropriate ones of said data elements from said second means for said telephone sets by traversing appropriate ones of said navigation sequences, each navigation sequence being traversed in a predetermined manner.

16. The apparatus as set forth in claim 15, wherein, said telephone sets further have telephone buttons and telephone features, and said telephone features have telephone feature parameters and relationships to one another, said first means constructs p1 (a.1) a telephone set type meta data structure using a first navigation sequence and a plurality of telephone set types, said first navigation sequence having a first plurality of data pointers pointing to said telephone set types;

(a.2) a telephone button meta data structure using a second navigation sequence and a plurality of telephone buttons, said second navigation sequence having a second plurality of data pointers pointing to said telephone buttons; and (a.3) a telephone feature meta data structure using a third navigation sequence for governing retrieval of telephone features, a plurality of telephone feature headers, a fourth plurality of navigation sequences for governing retrieval of telephone feature parameters, a fifth plurality of navigation sequences for governing retrieval of telephone feature relationships, a plurality of predicates, a plurality of telephone features, and a plurality of telephone parameters, said first navigation sequence comprising a first plurality of predicate pointers pointing to a first subset of said predicates, and a first plurality of data pointers pointing to said telephone features followed by their respective telephone feature headers, each of said telephone feature headers comprising a plurality of header pointers pointing to a subset of said fifth plurality of navigation sequences, each of said fourth plurality Of navigation sequences comprising a second plurality of predicate pointers pointing to a second subset of said predicates, and a second plurality of data pointers pointing to a subset of said telephone feature parameters, each of said fifth plurality of navigation sequences comprising a third plurality of predicate pointers pointing to a third subset of said predicates, and a third plurality of data pointers pointing to said telephone features.

17. The apparatus as set forth in claim 16, wherein said first means constructs, for a first telephone feature, a first of said fourth plurality of navigation sequences governing retrieval of elements to which the first telephone feature may be assigned, a second of said fourth plurality of navigation sequences governing retrieval of telephone features incompatible with the first telephone feature, and a third of said fourth plurality of navigation sequences governing retrieval of prerequisites for the first telephone feature.

18. The apparatus as set forth in claim 15, wherein, said predicates have predicate types;

said predicate types includes a telephone set predicate type and a telephone parameter predicate type;

said third means comprises a telephone set type evaluation function and a telephone parameter evaluation function for determining telephone set types and telephone parameter values respectively, using real time operational data.

19. A method for compiling rules and behaviors of telecommunication device types into device type model databases for modeling and emulating a plurality of telecommunication devices of said device types of a network of telecommunication systems, said method comprising the steps of:

(a) parsing statements specifying said rules and behaviors, and generating a plurality of intermediate lists using a computer, including a data element list linking said data elements of said device types, a predicate list linking predicates embedded in said rules and behaviors, a data relationship list linking data dependencies inferred by said rules and behaviors, a fix up list linking said data elements with unresolved locations in said device type model databases, and a build list for storing working information for building said device type model databases; and (b) building meta data structures using said generated intermediate lists using a computer.

20. A method for traversing a meta data structure of a device type model database compiled for modeling and emulating a plurality of telecommunication devices of a plurality of device types of a network of telecommunication systems, wherein said meta data structure comprises one or more data elements, one or more predicates, and at least one navigation sequence governing retrieval of and physically locating said data elements, said navigation sequence governing retrieval in conjunction with said predicates, said method comprising the steps of:

(a) reading a starting pointer of a first of said at least one navigation sequence of the meta data structure using a computer, each of said at least one navigation sequence of said meta data structure is a sequentially ordered combination of pointers comprising one or more data pointers, one or more predicate pointers, and one or more jump pointers, each data pointer pointing to either a data element or another one of said at least one navigation sequence of the meta data structure, each predicate pointer pointing to a predicate of the meta data structure, and each jump pointer pointing to either a data pointer or a predicate pointer later in order in the navigation sequence, the starting pointer being either a data pointer or a predicate pointer, a pointer following a data pointer being either another data pointer or a predicate pointer, a pointer following a predicate pointer being always a jump pointer, and a pointer following a jump pointer being either a predicate pointer or a data pointer;

(b) determining whether the pointer read is a predicate pointer or a data pointer using a computer;

(b.1) if the pointer is determined to be a data pointer, further determining if the data pointer is pointing to a data element or another navigation sequence using a computer;

(b.1.1) if the data pointer is determined to be pointing to a data element, retrieving the data element pointed by the data pointer using a computer;

(b.1.2) if the data pointer is determined to be pointing to another navigation sequence, traversing the navigation sequence pointed by the data pointer using a computer;

(b.2) if the pointer is determined to be a predicate pointer, evaluating the predicate pointed by the predicate pointer against real time operational data using a computer;

(b.2.1) if the predicate is evaluated to be false, reading the next pointer and jumping to the identified data/predicate pointer in accordance to the next pointer read using a computer;

(b.2.2) if the predicate is evaluated to be true, skipping the next pointer using a computer;

(c) if the next pointer is not the end of the navigation sequence, reading the next pointer and repeating steps (b) and (c), conditionally including selected ones of substeps (b.1), (b.1.1), (b.1.2), (b.2), (b.2.1), and (b.2.2) depending on said determinations/evaluations, else terminating the traversal using a computer.

21. An apparatus for compiling rules and behaviors of telecommunication device types into device type model databases for modeling and emulating a plurality of telecommunication devices of said device types of a network of telecommunication systems, said apparatus comprising:

(a) parsing means for parsing statements specifying said rules and behaviors, and generating a plurality of intermediate lists, including a data element list linking said data elements of said device types, a predicate list linking predicates embedded in said rules and behaviors, a data relationship list linking data dependencies inferred by said rules and behaviors, a fix up list linking said data elements with unresolved locations in said device type model databases, and a build list for storing working information for building said device type model databases; and (b) building means for building meta data structures using said generated intermediate lists.

22. An improved network of telecommunication systems comprising a plurality of telecommunication devices having device types, wherein the improvements comprise:

(a) first means for compiling statements specifying rules and behaviors of said device types into device type model databases, each of said device type model databases comprising a plurality of meta data structures, each of said meta data structures comprising one or more data elements of said device types, one or more predicates, and at least one navigational sequence governing retrieval of and physically locating said data elements, said navigation sequences facilitating said governing in conjunction with said predicates;

(b) second means for storing said device type model databases output by said first means;

(c) third means for interpreting user actions and device responses by retrieving appropriate ones of said data elements from said second means for said telecommunication devices by traversing appropriate ones of said navigation sequences, each navigation sequence being traversed in a predetermined manner.

* * * * *